United States Patent
Seto et al.

(10) Patent No.: US 9,988,027 B2
(45) Date of Patent: Jun. 5, 2018

(54) BRAKE SYSTEM AND VEHICLE

(71) Applicants: YAMAHA HATSUDOKI KABUSHIKI KAISHA, Iwata-shi, Shizuoka (JP); ADVICS CO., LTD., Kariya-shi, Aichi-ken (JP)

(72) Inventors: Hiroaki Seto, Shizuoka (JP); Kunihide Ohashi, Shizuoka (JP); Takeshi Yamamura, Shizuoka (JP); Yoshinori Tsuji, Shizuoka (JP); Hideki Takada, Shizuoka (JP); Kunio Kajihara, Shizuoka (JP); Masato Terasaka, Kariya (JP); Yutaka Hamamoto, Kariya (JP)

(73) Assignees: YAMAHA HATSUDOKI KABUSHIKI KAISHA, Shizuoka (JP); ADVICS CO., LTD., Aichi (JP)

( * ) Notice: Subject to any disclaimer, the term of this patent is extended or adjusted under 35 U.S.C. 154(b) by 89 days.

(21) Appl. No.: 15/033,562

(22) PCT Filed: Oct. 29, 2014

(86) PCT No.: PCT/JP2014/078803
§ 371 (c)(1),
(2) Date: Apr. 29, 2016

(87) PCT Pub. No.: WO2015/064654
PCT Pub. Date: May 7, 2015

(65) Prior Publication Data
US 2016/0264110 A1    Sep. 15, 2016

(30) Foreign Application Priority Data
Oct. 31, 2013    (JP) ................................. 2013-227456

(51) Int. Cl.
*B60T 8/1755*    (2006.01)
*B62K 5/10*    (2013.01)
(Continued)

(52) U.S. Cl.
CPC .......... *B60T 8/1755* (2013.01); *B60T 8/1706* (2013.01); *B62K 5/027* (2013.01); *B62K 5/05* (2013.01);
(Continued)

(58) Field of Classification Search
CPC . B62K 5/05; B62K 5/027; B62K 5/10; B62K 1/02; B60T 8/1755; B60T 8/1706; B60T 2230/03
(Continued)

(56) References Cited

U.S. PATENT DOCUMENTS 4,088,199 A * 5/1978 Trautwein ............ B60G 21/007
    180/209
4,351,410 A * 9/1982 Townsend ................ B62D 9/02
    180/210
(Continued)

FOREIGN PATENT DOCUMENTS

EP    1 721 797 A2    11/2006
EP    2 106 980 A1    10/2009
(Continued)

OTHER PUBLICATIONS

Official Communication issued in International Application PCT/JP2014/078803, dated Feb. 3, 2015.
(Continued)

*Primary Examiner* — Jacob D Knutson
(74) *Attorney, Agent, or Firm* — Keating and Bennett, LLP

(57) ABSTRACT

A brake system includes a brake activator which controls, when a slipping condition is detected at a central rear wheel
(Continued)

based on a signal detected by a central rear detector, the operating condition of a central rear brake based on the signal detected by the central rear detector so as to reduce a braking force on the central rear wheel lower than a braking force which is obtained as a result of operation of an input member. In this state, when an operation quantity of the input member increases as a result of operation of the input member, changing the operating conditions of both a right front brake and a left front brake, the brake activator increases the braking forces in both a right front wheel and a left front wheel according to an operation quantity of the input member.

11 Claims, 18 Drawing Sheets

(51) Int. Cl.
  *B60T 8/17* (2006.01)
  *B62K 5/027* (2013.01)
  *B62K 5/05* (2013.01)
  *B62L 1/02* (2006.01)

(52) U.S. Cl.
  CPC .................. *B62K 5/10* (2013.01); *B62L 1/02* (2013.01); *B60T 2230/03* (2013.01)

(58) Field of Classification Search
  USPC ........................................................ 280/283
  See application file for complete search history.

(56) References Cited

U.S. PATENT DOCUMENTS

| 5,324,102 | A | 6/1994 | Roll et al. | |
| 5,501,511 | A | 3/1996 | Wagner | |
| 7,143,853 | B1* | 12/2006 | Mercier | B60T 8/1706 180/210 |
| 7,571,787 | B2* | 8/2009 | Saiki | B60G 7/00 180/210 |
| 2007/0075582 | A1 | 4/2007 | Nakayama et al. | |
| 2009/0152940 | A1* | 6/2009 | Mercier | B60T 8/1706 303/113.2 |
| 2013/0168944 | A1* | 7/2013 | Bartolozzi | B60G 3/01 280/269 |

FOREIGN PATENT DOCUMENTS

| EP | 2 368 729 A1 | 9/2011 |
| JP | 4-26193 U | 3/1992 |
| JP | 2002-2461 A | 1/2002 |
| JP | 2009-241742 A | 10/2009 |
| JP | 2011-126514 A | 6/2011 |
| JP | 2011-195099 A | 10/2011 |
| JP | 2011-195100 A | 10/2011 |
| JP | 2012-17009 A | 1/2012 |
| JP | 2012-56503 A | 3/2012 |
| WO | 2012/007819 A1 | 1/2012 |

OTHER PUBLICATIONS

Official Communication issued in European Application No. 14 85 7108, dated Jan. 21, 2016.

Piaggio, Catalogo Parti Di Ricambio, NTRC000U01, MP3 300 ie Lt, Mod. ZAPM34102, 116 pages.

* cited by examiner

BRAKE SYSTEM AND VEHICLE

BACKGROUND OF THE PRESENT INVENTION

1. Field of the Invention

The present invention relates to a brake system for a vehicle including a body frame that leans, two front wheels, and one rear wheel and a vehicle including the brake system.

2. Description of the Related Art

A vehicle is known which includes a body frame which leans in a left-and-right direction of the vehicle when the vehicle is cornering, two front wheels which are aligned side by side in a left-and-right direction of the body frame and a central rear wheel which is disposed centrally between the two front wheels when the vehicle is seen from the front thereof with the body frame being in an upright state (for example, refer to International Patent Publication No. 2012/007819 and Catalogo partidi ricambio, MP3 300 LT Mod. ZAPM64102, Piaggio). A vehicle is also known which includes a body frame which leans in a left-and-right direction of the vehicle when the vehicle is cornering, two front wheels which are aligned side by side in a left-and-right direction of the body frame, and two rear wheels (for example, refer to Japanese Patent Unexamined Publication JP-A-2011-195099).

The vehicles described in International Patent Publication No. 2012/007819, Catalogo partidi ricambio, MP3 300 LT Mod. ZAPM64102, Piaggio and Japanese Patent Unexamined Publication JP-A-2011-195099 are vehicles which include a body frame which leans and two front wheels. The vehicle including the body frame which leans and the two front wheels includes a link mechanism. The link mechanism includes an upper cross member and a lower cross member. The link mechanism also includes a right side rod which supports right end portions of the upper cross member and the lower cross member and a left side rod which supports left end portions of the upper cross member and the lower cross member.

A middle portion of the upper cross member is connected to the body frame via a middle upper bearing so as to turn about a middle upper axis which extends in a front-and-rear direction of the body frame. The middle upper axis is inclined in such a way as to extend forwards in the front-and-rear direction of the body frame and upwards in an up-and-down direction of the body frame. The right end portion of the upper cross member is connected to the right side rod via a right upper bearing so as to turn about a right upper axis which extends in the front-and-rear direction of the body frame. The left end portion of the upper cross member is connected to the left side rod via a left upper bearing so as to turn about a left upper axis which extends in the front-and-rear direction of the body frame. A middle portion of the lower cross member is connected to the body frame via a middle lower bearing so as to turn about a middle lower axis which extends in the front-and-rear direction of the body frame. As with the middle upper axis, the middle lower axis is also inclined in such a way as to extend forwards in the front-and-rear direction of the body frame and upwards in the up-and-down direction of the body frame. The right end portion of the lower cross member is connected to the right side rod via a right lower bearing so as to turn about a right lower axis which extends in the front-and-rear direction of the body frame. The left end portion of the lower cross member is connected to the left side rod via a left lower bearing so as to turn about a left lower axis which extends in the front-and-rear direction of the body frame.

When the body frame leans in the left-and-right direction of the vehicle from its upright state, the upper cross member and the lower cross member turn relative to the body frame about the middle upper axis and the middle lower axis, respectively, so that a relative position of the two front wheels in relation to the up-and-down direction of the body frame changes. In addition, the middle upper axis and the middle lower axis are inclined in such a way as to extend forwards in the front-and-rear direction of the body frame and upwards in the up-and-down direction of the body frame, and therefore, the two front wheels move farther rearwards as they move upwards, while the two front wheels are displaced farther forwards as they move downwards. With the body frame being in the upright state, the upper cross member and the lower cross member are provided above the two front wheels in the up-and-down direction of the body frame. The link mechanism is provided above the left front wheel and the right front wheel in the up-and-down direction of the body frame when the vehicle is viewed from the front thereof with the body frame being in an upright state.

The vehicle including the body frame which leans and the two front wheels includes a right shock absorbing device which supports the right front wheel so as to move in the up-and-down direction of the body frame and a left shock absorbing device which supports the left front wheel so as to move in the up-and-down direction of the body frame. The right shock absorbing device is supported by the right side rod so that the right shock absorbing device is able to turn about a right axis which extends in the up-and-down direction of the body frame. The left shock absorbing device is supported by the left side rod so that the left shock absorbing device is able to turn about a left axis which extends in the up-and-down direction of the body frame. The vehicle described in International Patent Publication No. 2012/007819 includes further a handlebar, a steering shaft and a turn transmission mechanism. The handlebar is fixed to the steering shaft. The steering shaft is supported so as to turn relative to the body frame. When the handlebar is turned, the steering shaft also turns. The turn transmission mechanism transmits a turning motion of the steering shaft to the right shock absorbing device and the left shock absorbing device.

The vehicle including the body frame which leans and the two front wheels includes many on-board components provided on the periphery of the steering shaft. The on-board components include a lamp such as a headlamp, a radiator, a reservoir tank, an electric component such as a horn, a main switch of the vehicle, a stowage box, a stowage pocket and the like.

The vehicles described in International Patent Publication No. 2012/007819 and Catalogo partidi ricambio, MP3 300 LT Mod. ZAPM64102, Piaggio include a left and right front wheel braking input member which controls a braking force generated in the right front wheel and the left front wheel. Additionally, the vehicle includes a rear wheel braking input member which controls a braking force generated in the central rear wheel. Further, the vehicle includes left and right front wheel and central rear wheel braking input member which controls braking forces generated in the central rear wheel and the right front and left front wheels.

A front wheel master cylinder is activated when the left and right front wheels braking input member is operated. A hydraulic pressure generated by the front wheel master cylinder activates a primary tandem master cylinder. A hydraulic pressure generated in the primary tandem master cylinder is divided evenly to be transmitted to a right brake provided on the right front wheel and a left brake provided on the left front wheel. The right brake and the left brake which have received the hydraulic pressures generate braking forces.

A rear wheel master cylinder is activated when the rear wheel braking input member is operated. A hydraulic pressure generated by the rear wheel master cylinder activates a secondary master cylinder. A hydraulic pressure generated by the secondary master cylinder is transmitted to a central rear brake provided on the central rear wheel. The central rear brake which has received the hydraulic pressures generates braking forces.

A front and rear wheel master cylinder is activated when the left and right front wheel and rear wheel input member is operated. A hydraulic pressure generated by the front and rear wheel master cylinder activates the secondary master cylinder. A hydraulic pressure generated by the secondary master cylinder is transmitted to a central rear brake provided on the central rear wheel. Additionally, a portion of the hydraulic pressure generated by the front and rear wheels master cylinder passes through the secondary master cylinder to activate the primary tandem master cylinder. A hydraulic pressure generated by the primary tandem master cylinder is divided evenly to be transmitted to the right brake provided on the right front wheel and the left brake provided on the left front wheel. The central rear brake, the right brake, and the left brake which have received the hydraulic pressures generate braking forces.

The vehicles described in International Patent Publication No. 2012/007819 and Catalogo partidi ricambio, MP3 300 LT Mod. ZAPM64102, Piaggio use three types of brake systems which are different in operation.

The vehicles described in International Patent Publication No. 2012/007819 and Catalogo partidi ricambio, MP3 300 LT Mod. ZAPM64102, Piaggio which include the body frame which leans, the two front wheels, and the single rear wheel include the right front wheel, the central rear wheel and the left front wheel which are aligned side by side in the left-and-right direction of the body frame when the vehicle is viewed from the front thereof with the body frame being in an upright state. Because of this, when the vehicle runs, the right front wheel, the central rear wheel and the left front wheel pass over different road surfaces. The vehicle described in Japanese Patent Unexamined Publication JP-A-2011-195099 which includes the body frame which leans, the two front wheels and the two rear wheels include the right front wheel, the right rear wheel, the left front wheel and the left rear wheel which are aligned side by side in the left-and-right direction of the body frame when the vehicle is viewed from the front thereof with the body frame being in an upright state. Because of this, when the vehicle runs, the right front wheel and the right rear wheel pass over road surfaces which are almost the same, and the left front wheel and the left rear wheel pass over road surfaces which are almost the same. In this way, the road surfaces which the wheels of the vehicle pass over which includes the body frame which leans, the two front wheels, and the single central rear wheel become different from the road surfaces which the wheels of the vehicle which includes the body frame which leans, the two front wheels and the two rear wheels.

The vehicles described in International Patent Publication No. 2012/007819 and Catalogo partidi ricambio, MP3 300 LT Mod. ZAPM64102, Piaggio which include the body frame which leans, the two front wheels, and the single rear wheel include the two front wheels, the two shock absorbing devices which support individually the two front wheels, the link mechanism which supports the two shock absorbing devices, the single central rear wheel and one shock absorbing device which supports the single central rear wheel. The vehicle described in Japanese Patent Unexamined Publication JP-A-2011-195099 which includes the body frame which leans, the two front wheels and the two rear wheels include the two front wheels, two shock absorbing devices which support individually the two front wheels, a link mechanism which supports the two shock absorbing devices, the two rear wheels and one shock absorbing device which supports the two rear wheels.

There is a tendency that a ratio of the magnitude of load applied to the front wheels to the magnitude of load applied to the front wheels and the rear wheel or wheels becomes larger relative to that in the vehicle including the body frame which leans, the two front wheels, and the single central rear wheel than in the vehicle including the body frame which leans, the two front wheels and the two rear wheels. It is noted that the load applied to the front wheels is not necessarily larger than the load applied to the rear wheel or wheels. In fact, the load applied individually to the front wheels and the rear wheel or wheels change depending upon the layout of the drive source such as the engine mounted on the body frame, the seated position of the rider or the like.

The vehicles described in International Patent Publication No. 2012/007819, Catalogo partidi ricambio, MP3 300 LT Mod. ZAPM64102, Piaggio and Japanese Patent Unexamined Publication JP-A-2011-195099 which include the body frame which leans and the two front wheels turn with the body frame leaning in the left-and-right direction of the vehicle. As this occurs, the vehicle including the body frame which leans and the two front wheels has a tendency that a load applied to the front wheel which defines the inner wheel having a smaller turning radius becomes relatively larger than a load applied to the front wheel which defines the outer wheel having a larger turning radius. This is attributed to the configuration of the vehicle in which the middle upper axis and the middle lower axis are provided so as to lean in such a way as to extend forwards in the front-and-rear direction of the body frame and upwards in the up-and-down direction of the body frame. With the body frame leaning in the left-and-right direction of the vehicle, the inner wheel is positioned upwards and the outer wheel is positioned downwards in the up-and-down direction of the body frame. In addition, the inner wheel is positioned rearwards in the front-and-rear direction and the outer wheel is positioned forwards in the front-and-rear direction of the body frame. A distance between the front wheel which defines the inner wheel and the rear wheel is shorter than a distance between the front wheel which defines the outer wheel and the rear wheel. Due to this, the vehicle including the body frame which leans and the two front wheels has the tendency that the load applied to the front wheel which defines the inner wheel having the smaller turning radius becomes relatively larger than the load applied to the front wheel which defines the outer wheel having the larger turning radius.

The vehicles described in International Patent Publication No. 2012/007819 and Catalogo partidi ricambio, MP3 300 LT Mod. ZAPM64102, Piaggio which include the body frame which leans, the two front wheels, and the single rear wheel include the link mechanism which is provided above the right front wheel and the left front wheel in the up-and-down direction of the body frame when the vehicle is viewed from the front with the body frame being in an upright state. In this configuration, with the body frame being in the upright state, the right front wheel, the right shock absorbing device, the left shock absorbing device and the left front wheel are aligned side by side in the left-and-right direction of the body frame, and the link mechanism is not present between the right front wheel and the left front wheel. Because of this, the distance between the right front wheel and the left front wheel of the vehicle described in International Patent Publication No. 2012/007819 and Catalogo partidi ricambio, MP3 300 LT Mod. ZAPM64102, Piaggio which include the body frame which leans, the two front wheels, and the single rear wheel is shorter than a distance between a right front wheel and a left front wheel of a vehicle in which a link mechanism is disposed between the right front wheel and the left front wheel. This causes a tendency that a difference between a load applied to the front wheel which defines an outer wheel having a larger turning radius and a load applied to the front wheel which defines an inner wheel having a smaller turning radius becomes smaller in the vehicles described in International Patent Publication No. 2012/007819 and Catalogo partidi ricambio, MP3 300 LT Mod. ZAPM64102, Piaggio which include the body frame which leans, the two front wheels, and the single rear wheel that in the vehicle in which the link mechanism is disposed between the right front wheel and the left front wheel.

The vehicles described in International Patent Publication No. 2012/007819 and Catalogo partidi ricambio, MP3 300 LT Mod. ZAPM64102, Piaggio have the configuration and characteristics which are described above. The vehicles described in International Patent Publication No. 2012/007819 and Catalogo partidi ricambio, MP3 300 LT Mod. ZAPM64102, Piaggio use three types of brake systems which are different in operation.

SUMMARY OF THE INVENTION

Preferred embodiments of the present invention provide a brake system for a vehicle including a body frame which leans, two front wheels, and a single rear wheel and which operates differently from the three types of brake systems which are conventionally used. Other preferred embodiments of the present invention provide a vehicle including a brake system which operates differently from the three types of brake systems which are conventionally used, a body frame which leans, two front wheels, and a single rear wheel.

A preferred embodiment of the present invention preferably includes the following configuration.

(1) A brake system for a vehicle including a body frame; a right front wheel and a left front wheel which are aligned in a left-and-right direction of the body frame when the vehicle is viewed from a front thereof with the body frame being in an upright state; a central rear wheel which is provided behind the right front wheel and the left front wheel in a front-and-rear direction of the body frame and which is disposed between the right front wheel and the left front wheel when the vehicle is viewed from the front thereof with the body frame being in the upright state; a right shock absorbing device which supports the right front wheel at a lower portion thereof and absorbs an upward displacement of the right front wheel in an up-and-down direction of the body frame; a left shock absorbing device which supports the left front wheel at a lower portion thereof and absorbs an upward displacement of the left front wheel in the up-and-down direction of the body frame; and a link mechanism which is provided above the right front wheel and the left front wheel in the up-and-down direction of the body frame when the vehicle is viewed from the front thereof with the body frame being in the upright state and supports an upper portion of the right shock absorbing device and an upper portion of the left shock absorbing device so as to turn, and at least a portion of which is supported on the body frame so as to turn about a turning axis which extends forwards in the front-and-rear direction of the body frame and upwards in the up-and-down direction of the body frame, the brake system including a central rear brake which is provided on the central rear wheel and which generates a braking force on the central rear wheel; a right front brake which is provided on the right front wheel and which generates a braking force on the right front wheel; a left front brake which is provided on the left front wheel and which generates a braking force on the left front wheel; a central rear wheel slip detector that detects a slipping condition at the central rear wheel; an input member operated by a rider; and a brake activator that, at least while the vehicle is turning with the body frame leaning in a left-and-right direction of the vehicle and while the central rear brake, the right front brake, and the left brake are in operation as a result of operation of the input member and in such a state that both the front wheels of the right front wheel and the left front wheel are not slipping, when a slipping condition is detected at the central rear wheel based on a signal detected by the central rear wheel slip detector, controls the operating condition of the central rear brake based on the signal detected by the central rear wheel slip detector so as to reduce a braking force on the central rear wheel lower than a braking force which is obtained as a result of operation of the input member, and in this state, when an operation quantity of the input member increases as a result of operation of the input member changing the operating conditions of both the right front brake and the left front brake, increases braking forces in both the right front wheel and the left front wheel according to the operation quantity of the input member.

According to the configuration (1) above, the brake system includes the right front brake, the left front brake, the central rear brake, the input and the brake activator which activates the three brakes by operating the input. Because of this, the brake system is able to be used for a vehicle which includes a body frame which leans, two front wheels and one rear wheel.

The vehicle including the body frame which leans, the two front wheels, and the single rear wheel has the following characteristics when the vehicle is turning with the body frame leaning in the left-and-right direction of the vehicle.

When the vehicle is turning with the body frame leaning to the right, the right front wheel defines an inner wheel having a smaller turning radius and the left front wheel defines an outer wheel having the larger turning radius. When the vehicle is turning with the body frame leaning to the left, the left front wheel defines the inner wheel having the smaller turning radius and the right front wheel defines the outer wheel having the larger turning radius. Since the vehicle turns with the body frame leaning in the left-and-right direction of the vehicle, a load exerted on the front wheel which defines the inner wheel while the vehicle is turning basically tends to be larger than a load exerted on the front wheel which defines the outer wheel. Moreover, the vehicle including the single central rear wheel has a tendency that a load exerted on the front wheels becomes larger relatively than a load exerted on the rear wheel, compared with a vehicle including a left rear wheel and a right rear wheel. Because of this, the load exerted on the front wheel which defines the inner wheel tends basically to be greater than the load exerted on the front wheel which defines the outer wheel of the vehicle which is turning. In addition, the front wheel which defines the inner wheel and the front wheel which defines the outer wheel of the vehicle which is turning pass over different road surfaces. Because of this, there is a possibility that the two front wheels pass over road surfaces having different friction coefficients.

The inventor of the present invention has studied brake systems while taking into consideration the characteristics of the vehicle having the body frame which leans, the two front wheels, and the single rear wheel. Additionally, the inventor has studied the braking forces in the central rear wheel, the right front wheel and the left front wheel at least while the vehicle is turning with the body frame leaning in the left-and-right direction of the vehicle and while the central rear brake, the right front brake and the left front brake are in operation. It has been discovered as a result of the studies that the central rear wheel is easy to start slipping earlier than the right front wheel and the left front wheel. Additionally, it has been discovered that even in such a state, the braking forces in the front wheels are increased on many occasions. Moreover, the front wheel which defines the inner wheel, the front wheel which defines the outer wheel and the central rear wheel of the vehicle which is turning pass over road surfaces which are different from one another. This results in a high possibility that the front wheel which defines the inner wheel, the front wheel which defines the outer wheel and the central rear wheel of the vehicle which is turning pass over road surfaces having friction coefficients which differ from one another.

The inventor of the present invention has conceived a brake system which takes this situation into consideration.

When referred to herein, slip refers to a slip in a rotating direction of the right front wheel, a slip in a rotating direction of the left front wheel, and a slip in a rotating direction of the rear wheel. For example, this slip is able to be detected based on a difference between a body speed and a wheel speed. Further, that any one of the three wheels is in a slipping condition means that the wheel in question is likely to lock.

According to the configuration (1) above, the brake activator operates in the following manner at least while the vehicle is turning with the body frame leaning in the left-and-right direction of the vehicle and while the central rear brake, the right front brake and the left front brake are in operation as a result of operation of the input member and in such a state that both the right front wheel and the left front wheel are not slipping. When a slipping condition is detected at the central rear wheel based on a signal detected by the central rear wheel slip detector, the brake activator controls the operating condition of the central rear brake based on the signal detected by the central rear wheel slip detector so as to reduce the braking force on the central rear wheel lower than the braking force which is obtained as a result of operation of the input member. In this state, when the operation quantity of the input member increases as a result of operation of the input member changing the operating conditions of both the right front brake and the left front brake, the brake activator increases the braking forces in both the right front wheel and the left front wheel according to the operation quantity of the input member. This provides a brake system which is able to be used for the vehicle including the body frame which leans, the two front wheels, and the single rear wheel and which differs in operation from the conventional three brake systems.

A preferred embodiment of the present invention preferably includes the following configuration.

(2) The braking system, including a right front wheel slip detector that detects a slipping condition at the right front wheel; and a left front wheel slip detector that detects a slipping condition at the left front wheel, wherein at least while the vehicle is turning with the body frame leaning in the left-and-right direction of the vehicle and while the central rear brake, the right front brake and the left front brake are in operation as a result of operation of the input member and in such a state that a slipping condition is not detected at both the front wheels of the right front wheel and the left front wheel based on signals detected by the right front wheel slip detector and the left front wheel slip detector, when a slipping condition is detected at the central rear wheel based on a signal detected by the central rear wheel slip detector, the brake activator controls the operating condition of the central rear brake based on the signal detected by the central rear wheel slip detector so as to reduce a braking force on the central rear wheel lower than a braking force which is obtained as a result of operation of the input member, and in this state, when an operation quantity of the input member increases as a result of operation of the input member changing the operating conditions of both the right front brake and the left front brake, the brake activator increases braking forces in both the right front wheel and the left front wheel according to the operation quantity of the input member.

According to the configuration (2) above, the brake activator operates in the following manner at least while the vehicle is turning with the body frame leaning in the left-and-right direction of the vehicle and while the central rear brake, the right front brake, and the left front brake are in operation as a result of operation of the input member and in such a state that the slipping condition is not detected at both the right front wheel and the left front wheel based on the signals detected by the right front wheel slip detector and the left front wheel slip detector. When a slipping condition is detected at the central rear wheel based on a signal detected by the central rear wheel slip detector, the brake activator controls the operating condition of the central rear brake based on the signal detected by the central rear wheel slip detector so as to reduce the braking force on the central rear wheel to lower than the braking force which is obtained as a result of operation of the input member. In this state, when the operation quantity of the input member increases as a result of operation of the input member changing the operating conditions of both the right front brake and the left front brake, the brake activator increases the braking forces in both the right front wheel and the left front wheel according to the operation quantity of the input member. This provides a brake system which is able to be used for the vehicle including the body frame which leans, the two front wheels, and the single rear wheel and which differs in operation from the conventional three brake systems.

A preferred embodiment of the present invention preferably includes the following configuration.

(3) The brake system, wherein further, in this state, when a slipping condition is detected at one of the front wheels or either at the right front wheel or at the left front wheel based on signals which are detected by the right front wheel slip detector and the left front wheel slip detector, the brake activator controls the operating conditions of both the right front brake and the left front brake based on the signal detected by one of the front wheel slip detectors to reduce the braking forces in both the right front wheel and the left front wheel to lower than braking forces which are obtained as a result of operation of the input member.

According to the configuration (3) above, further, in that state, when the slipping condition is detected at one of the front wheels or either at the right front wheel or at the left front wheel based on the signals which are detected by the right front wheel slip detector and the left front wheel slip detector, the brake activator controls the operating conditions of both the right front brake and the left front brake based on the signal detected by one of the front wheel slip detectors to reduce the braking forces in both the right front wheel and the left front wheel to lower than the braking forces which are obtained as a result of operation of the input member. This provides a brake system which is able to be used for the vehicle including the body frame which leans, the two front wheels, and the single rear wheel and which differs in operation from the conventional three brake systems.

A preferred embodiment of the present invention preferably includes the following configuration.

(4) The brake system, wherein further, in that state, although a slipping condition is detected at either of the front wheels or either at the right front wheel or at the left front wheel based on signals which are detected by the right front wheel slip detector and the left front wheel slip detector, the brake activator does not change immediately the operating condition of the right front brake or the left front brake on the one of the front wheels based on the signal detected by the one of the front wheel slip detectors.

According to the configuration (4) above, further, in that state, although the slipping condition is detected at either of the front wheels or either at the right front wheel or at the left front wheel based on the signals which are detected by the right front wheel slip detector and the left front wheel slip detector, the brake activator does not change immediately the operating condition of the right front brake or the left front brake on the one of the front wheels based on the signal detected by the one of the front wheel slip detectors. This provides a brake system which is able to be used for the vehicle including the body frame which leans, the two front wheels, and the single rear wheel and which differs in operation from the conventional three brake systems.

A preferred embodiment of the present invention preferably includes the following configuration.

(5) The brake system, wherein the brake activator includes a controller between the input member and the central rear brake and which is programmed or configured, when a slipping condition is detected at the central rear wheel based on a signal which is detected by the central rear wheel slip detector, to control the operating condition of the central rear brake based on the signal which is detected by the central rear wheel slip detector; and an operator which is provided between the input member and the right front brake and the left front brake that changes the operating conditions of the right front brake and the left front brake according to an operation quantity of the input member by associating the quantity of the input member with the operating conditions of the right front brake and the left front brake.

According to the configuration (5) above, the brake activator includes the controller between the input member and the central rear brake and which is programmed or configured, when the slipping condition is detected at the central rear wheel based on the signal which is detected by the central rear wheel slip detector, to control the operating condition of the central rear brake based on the signal which is detected by the central rear wheel slip detector, and the operator between the input member and the right front brake and the left front brake and that changes the operating conditions of the right front brake and the left front brake according to the operation quantity of the input member by associating the operation quantity of the input member with the operating conditions of the right front brake and the left front brake. This provides a brake system which is able to be used for the vehicle including the body frame which leans, the two front wheels, and the single rear wheel and which differs in operation from the conventional three brake systems.

A preferred embodiment of the present invention preferably includes the following configuration.

(6) The brake system, wherein at least while the vehicle is turning with the body frame leaning in the left-and-right direction of the vehicle, the brake activator activates first the central rear brake among the right front brake, the left front brake, and the central rear brake as a result of operation of the input member and activates last one of the right front brake and the left front brake on the front wheel which defines an inner wheel having a smaller turning radius.

According to the configuration (6) above, at least while the vehicle is turning with the body frame leaning in the left-and-right direction of the vehicle, the brake activator activates first the central rear brake among the right front brake, the left front brake, and the central rear brake as a result of operation of the input member and activates last one of the right front brake and the left front brake which is provided on the front wheel which defines the inner wheel having the smaller turning radius. This provides a brake system which is able to be used for the vehicle including the body frame which leans, the two front wheels, and the single rear wheel and which differs in operation from the conventional three brake systems.

A preferred embodiment of the present invention preferably includes the following configuration.

(7) A vehicle including the brake system according to any one of the preferred embodiments of the present invention above.

According to the configuration (7) above, it is possible to provide a brake system which is able to be used for the vehicle including the body frame which leans, the two front wheels, and the single rear wheel and which differs in operation from the three brake systems which have conventionally been used.

A preferred embodiment of the present invention preferably includes the following configuration.

(8) The vehicle, wherein the right shock absorbing device includes a right telescopic element which extends and contracts in an extending and contracting direction which extends in the up-and-down direction of the body frame and allows the right front wheel to be displaced in the extending and contracting direction of the right telescopic element, and where the left shock absorbing device includes a left telescopic element which extends and contracts in an extending and contracting direction which extends in the up-and-down direction of the body frame and allows the left front wheel to be displaced in the extending and contracting direction of the left telescopic element.

According to the configuration (8) above, the displacement of the right front wheel and the left front wheel in the up-and-down direction of the body frame by the right shock absorbing device and the left shock absorbing device is larger than the displacement of the conventional link-type shock absorbing devices. Because of this, the change in posture of the vehicle becomes larger in the vehicle including the configuration (8) above than in the conventional vehicle including the link-type shock absorbing devices. The vehicle including the configuration (8) above has a tendency that the load exerted on the front wheel which defines the inner wheel becomes larger basically than the load exerted on the front wheel which defines the outer wheel of the vehicle which is turning by the change in posture of the vehicle. The brake system according to any one of the preferred embodiments of the present invention above is able to be used for the vehicle including telescopic shock absorbing devices which allow the large displacement of the front wheels in the up-and-down direction of the body frame, the body frame which leans, the two front wheels, and the single rear wheel. According to the configuration (8) above, it is possible to provide a brake system which is able to be used for the vehicle including the body frame which leans, the two front wheels, and the single rear wheel and which differs in operation from the three brake systems which have conventionally been used.

A preferred embodiment of the present invention preferably includes the following configuration.

(9) The vehicle, wherein the link mechanism is above the right front wheel and the left front wheel in the up-and-down direction of the body frame when the vehicle with the body frame being in the upright state is viewed from the front thereof, and wherein the right front wheel and the left front wheel overlap the central rear wheel when the vehicle is viewed from the front thereof with the right shock absorbing device and the left shock absorbing device turned most relative to the link mechanism.

According to the configuration (9) above, the distance between the right front wheel and the left front wheel becomes short. Because of this, the difference between the turning radius of the inner wheel and the turning radius of the outer wheel also becomes small. In addition, by making the difference in turning radius small, it is possible to make the difference small between the load exerted on the front wheel which defines the inner wheel and the load exerted on the front wheel which defines the outer wheel of the vehicle which is turning. The brake system according to any one of the preferred embodiments of the present invention above is able to be used for the vehicle including the body frame which leans, the single rear wheel, and the right front wheel and the left front wheel which are disposed with a short distance defined therebetween. In particular, it is especially preferable to use the brake system according to configuration (6) above. According to the configuration (9) above, it is possible to provide a vehicle including the body frame which leans, the single rear wheel, the right front wheel and the left front wheel which are disposed with a short distance defined therebetween and the brake system which differs in operation from the conventional three brake systems.

A preferred embodiment of the present invention preferably includes the following configuration.

(10) The vehicle, including a second brake system which includes a second input member which differs from the input member; and a second brake activator which activates the right front brake, the left front brake, and a central rear brake on the central rear wheel as a result of operation of the second input member at least while the vehicle is turning with the body frame leaning in the left-and-right direction of the vehicle.

According to the configuration (10) above, the vehicle includes the second brake system which includes the second input member which differs from the input member, and the second brake activator which activates the right front brake, the left front brake, and the central rear brake on the central rear wheel as a result of the operation of the second input member at least while the vehicle is turning with the body frame leaning in the left-and-right direction of the vehicle. Consequently, it is possible to provide a vehicle including the body frame which leans, the single rear wheel, the right front wheel and the left front wheel which are disposed with a short distance therebetween and the two types of brake systems which differ in operation.

A preferred embodiment of the present invention preferably includes the following configuration.

(11) The vehicle, wherein the second brake activator activates the right front brake and the left front brake by using at least a portion of the brake activator.

According to the configuration (11) above, the second brake activator uses at least a portion of the brake activator, and therefore, the system configuration is simple.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
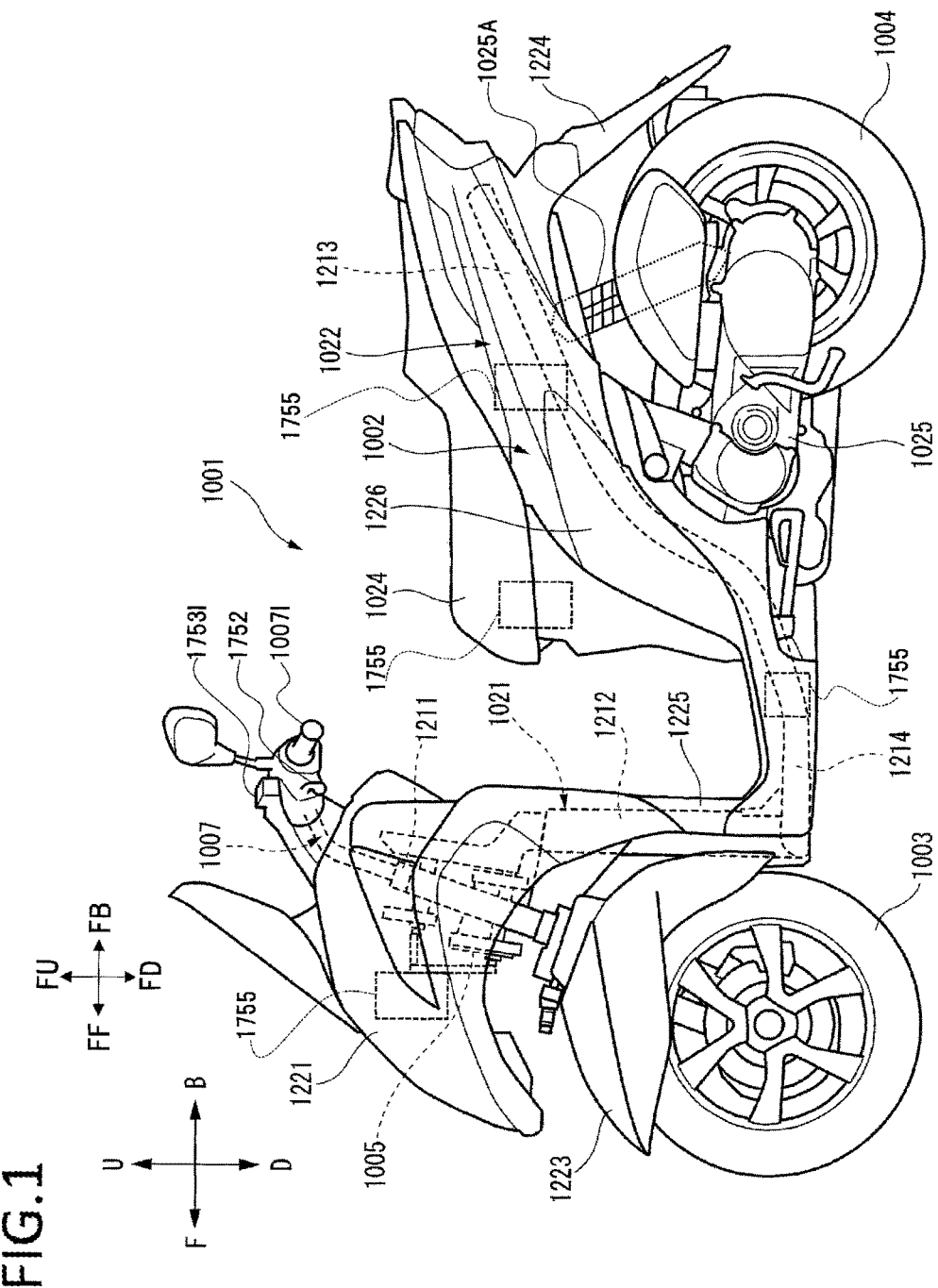
FIG. 1 is an overall side view of a vehicle according to a first preferred embodiment of the present invention.

Hereinafter, the present invention will be described based on preferred embodiments by reference to the drawings.

In the following descriptions, an arrow F in the drawings indicates a forward direction of a vehicle and an arrow B indicates a rearward direction of the vehicle. An arrow U indicates an upward direction of the vehicle and an arrow D indicates a downward direction of the vehicle. An arrow R in the drawings indicates a rightward direction of the vehicle and an arrow L indicates a leftward direction of the vehicle. The vehicle turns by causing a body frame to lean in a left-and-right direction of the vehicle relative to the vertical direction. Then, directions are also defined based on the body frame separately from the directions of the vehicle. In the drawings, an arrow FF indicates a forward direction based on the body frame, and an arrow FB indicates a rearward direction based on the body frame. In the drawings, an arrow FU indicates an upward direction based on the body frame, and an arrow FD indicates a downward direction based on the body frame. In the drawings, an arrow FR indicates a rightward direction based on the body frame, and an arrow FL indicates a leftward direction based on the body frame. In the description, the front-and-rear direction of the vehicle, the up-and-down direction of the vehicle and the left-and-right direction of the vehicle denote the front-and-rear, the left-and-right and up-and-down directions as viewed from a rider who rides on the vehicle, and those directions are based on the vehicle. Additionally, in this description, the front-and-rear direction of the body frame, the up-and-down direction of the body frame, and the left-and-right direction of the body frame denote the front-and-rear, the left-and-right and up-and-down direction as viewed from the rider who rides on the vehicle, and those directions are based on the body frame. A center in a vehicle's width direction refers to a center of a vehicle's width in the left-and-right direction of the vehicle. In other words, the center in the vehicle's width direction refers to a center of the left-and-right direction of the vehicle. Additionally, in the description, an upright state denotes a state where the up-and-down direction of the body frame coincides with the vertical direction. In this state, the direction of the vehicle coincides with the direction of the body frame. When the vehicle is turning with the body frame leaning in the left-and-right direction relative to the vertical direction, the left-and-right direction of the vehicle does not coincide with the left-and-right direction of the body frame. Additionally, the up-and-down direction of the vehicle does not coincide with the up-and-down direction of the body frame, too. However, the front-and-rear direction of the vehicle coincides with the front-and-rear direction of the body frame.

Hereinafter, referring to FIGS. 1 to 7, a vehicle according to a first preferred embodiment of the present invention will be described.

In the first preferred embodiment, a brake system will be described which is mounted on, for example, a three-wheeled vehicle (hereinafter, referred to as a vehicle) including a body frame which leans, two front wheels and one front wheel.

FIG. 1 is an overall side view of a vehicle as viewed from the left of a left-and-right direction of a body frame.

As shown in FIG. 1, a vehicle 1001 includes a vehicle main body portion 1002. The vehicle 1001 includes a pair of left and right front wheels 1003. The vehicle 1001 includes a central rear wheel 1004. The vehicle 1001 includes a steering mechanism 1007. The vehicle 1001 includes a link mechanism 1005. The vehicle main body portion 1002 includes a body frame 1021, a body cover 1022, a seat 1024 and a power unit 1025.

The body frame 1021 includes a headstock 1211, a down frame 1212, an under frame 1214, and a rear frame 1213. In FIG. 1, in the body frame 1021, portions which are hidden by the body cover 1022 are shown by broken lines. The body frame 1021 supports the power unit 1025, the seat 1024, and the like. The body frame 1021 supports the power unit 1025, the seat 1024 and the like directly or indirectly via brackets. The power unit 1025 includes a drive source such as an engine, an electric motor or the like, a transmission and the like. In addition, the central rear wheel 1004 is supported on the power unit 1025. A driving force of the drive source is transmitted to the central rear wheel 1004 via the transmission. Further, the power unit 1025 is supported on the body frame 1021 so as to swing. A front portion of the power unit 1025 is supported on the body frame 1021 so as to swing. The power unit 1025 is supported on the body frame 1021 via a rear shock absorbing device 1025A. A rear portion of the power unit 1025 is supported on the body frame 1021 via the rear shock absorbing device 1025A. This configuration allows the central rear wheel 1004 to be displaced in an up-and-down direction of the body frame.

The headstock 1211 is disposed at a front portion of the vehicle 1001. A steering shaft 1060 of the steering mechanism 1007 is inserted into the headstock 1211 so as to be turned therein. An upper portion of the headstock 1211 is positioned farther rearwards than a lower portion thereof when the body frame is viewed from the left-and-right direction of the vehicle. The headstock 1211 is disposed so that a turning axis thereof inclines relative to the up-and-down direction of the body frame. The turning axis of the headstock 1211 extends upwards and rearwards of the body frame. The steering mechanism 1007 and the link mechanism 1005 are disposed on the circumference of the headstock 1211. The headstock 1211 supports the link mechanism 1005. The headstock 1211 supports at least a portion of the link mechanism 1005 so as to turn. The headstock 1211 supports at least a portion of the link mechanism 1005 so as to turn about a turning axis which extends forwards in the front-and-rear direction of the body frame 1021 and upwards in the up-and-down direction of the body frame 1021.

The down frame 1212 is connected to the headstock 1211. The down frame 1212 is disposed behind the headstock 1211 and extends along the up-and-down direction of the vehicle 1001. The under frame 1214 is connected to a lower portion of the down frame 1212. The under frame 1214 extends towards the rear from the lower portion of the down frame 1212. The rear frame 1213 extends rearwards and upwards directly behind the under frame 1214. The rear frame 1213 supports the seat 1024, the power unit 1025, a tail lamp and the like.

The body frame 1021 is covered by the body cover 1022. The body cover 1022 includes a front cover 1221, a pair of left and right front mudguards 1223, a leg shield 1225, a center cover 1226 and a rear mudguard 1224. The body cover 1022 is a body structure which covers at least a portion of elements such as the pair of left and right front wheels 1003, the body frame 1021, the link mechanism 1005 and the like which are mounted on the vehicle.

The front cover 1221 is positioned ahead of the seat 1024. The front cover 1221 covers at least a portion of the steering mechanism 1007 and the link mechanism 1005. The leg shield 1225 which covers at least a portion of legs of the rider from the front is disposed behind the pair of left and right front wheels 1003 and ahead of the seat 1024. The center cover 1226 is disposed so as to cover the circumference of the rear frame 1213. The center cover 1226 is disposed so as to cover an upper portion of the rear frame 1213. The center cover 1226 is disposed so as to cover left and right side portions of the rear frame 1213.

At least portions of the pair of left and right front mudguards 1223 are disposed directly below the front cover 1221. At least portions of the pair of left and right front mudguards 1223 are disposed directly above the pair of left and right front wheels 1003, respectively. At least a portion of a rear mudguard 1224 is disposed directly above the central rear wheel 1004.

At least portions of the pair of left and right front wheels 1003 are disposed directly below the headstock 1211 in the upright state. At least portions of the pair of left and right front wheels 1003 are disposed directly below the front cover 1221 in the upright state. At least a portion of the central rear wheel 1004 is disposed directly below the center cover 1226 or the seat 1024. At least a portion of the central rear wheel 1004 is disposed directly below the rear mudguard 1224.

Figure 2:
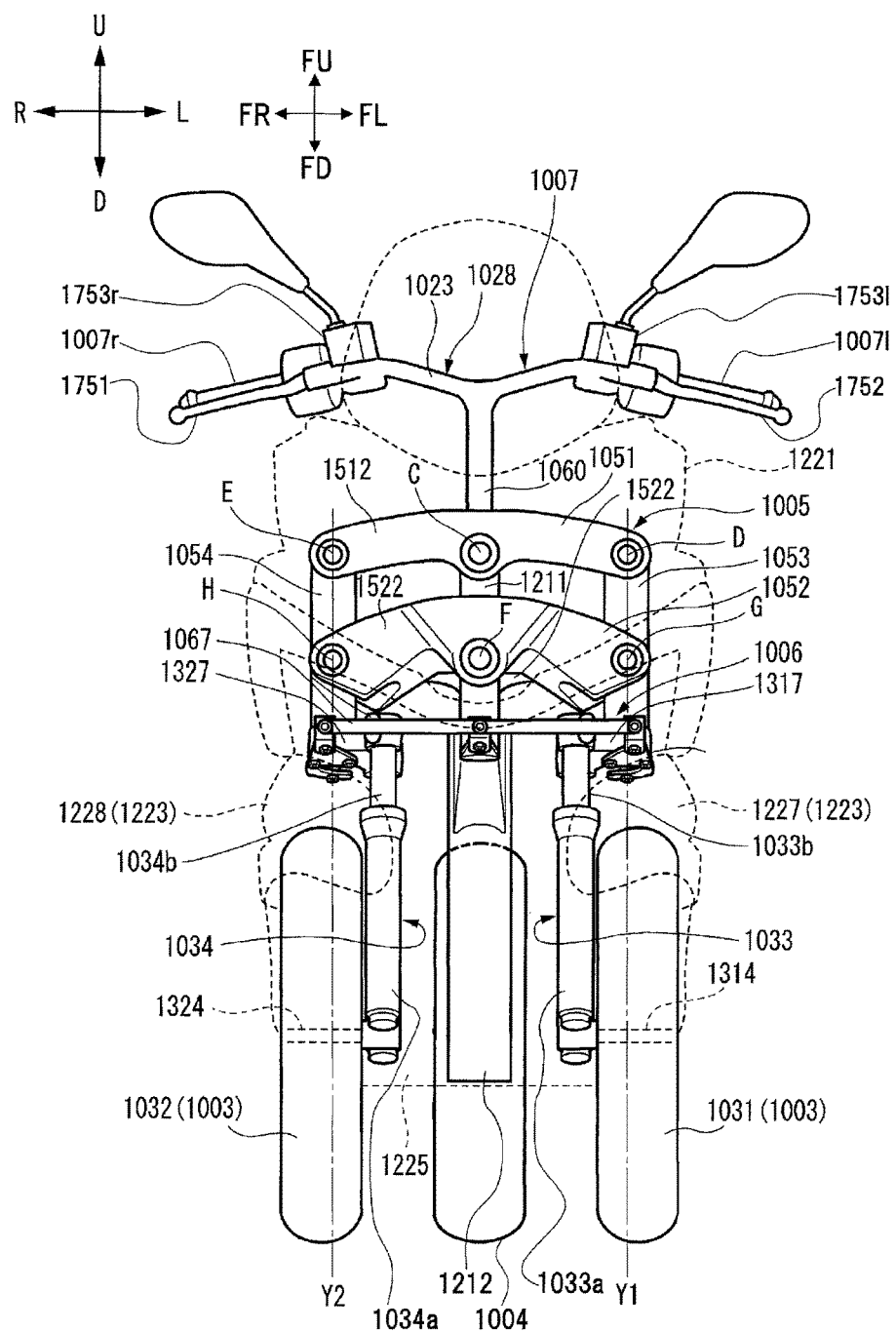
FIG. 2 is a front view of a front portion of the vehicle shown in FIG. 1.
Figure 3:
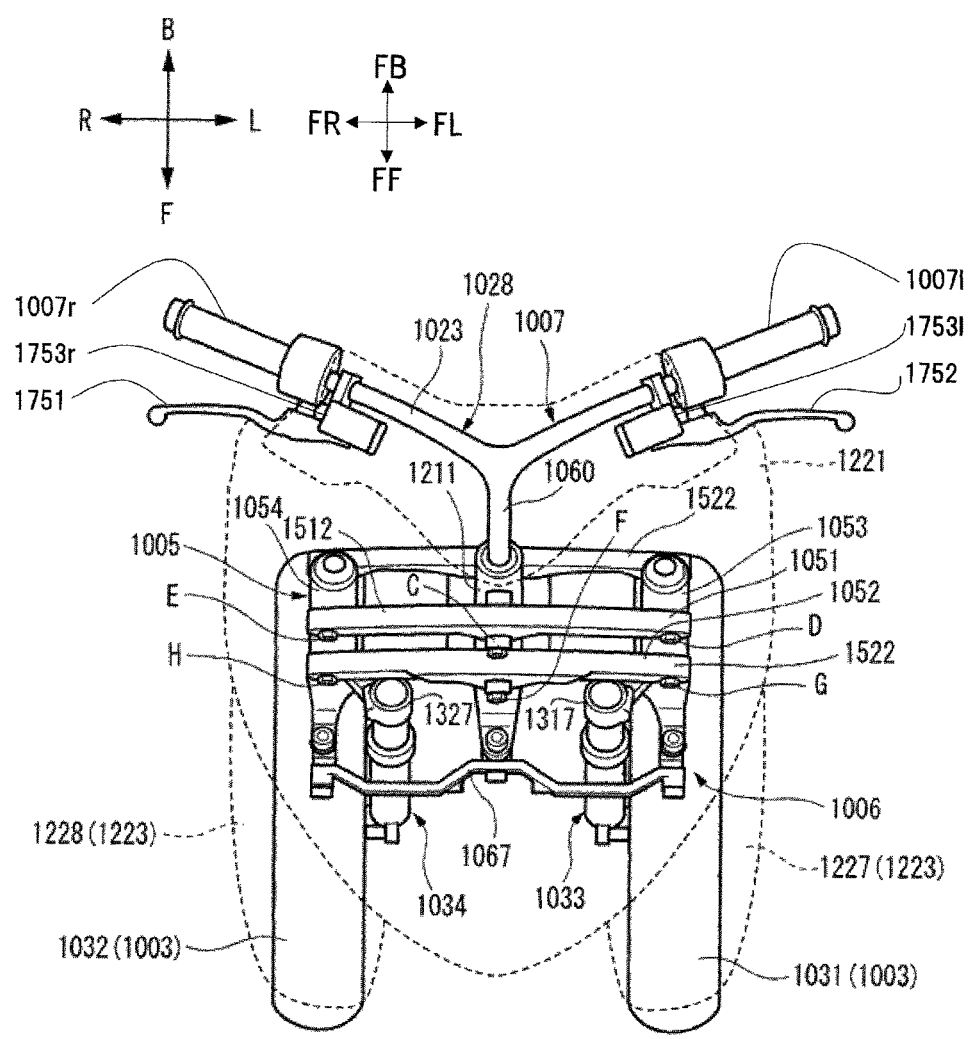
FIG. 3 is a plan view of the front portion of the vehicle shown in FIG. 1.

FIG. 2 is a front view of the front portion of the vehicle 1001 shown in FIG. 1 when viewed from the front thereof. FIG. 2 is the view resulting from viewing the vehicle 1001 from the front thereof with the body frame 1021 being in the upright state. FIG. 3 is a plan view of the front portion of the vehicle 1001 shown in FIG. 1 when viewed from above. FIG. 3 is the view resulting from viewing the vehicle 1001 from above with the body frame 1021 being in the upright state. FIGS. 2 and 3 show the front portion of the vehicle 1001 as seen through the body cover 1022.

As shown in FIGS. 2 and 3, the steering mechanism 1007 includes a steering effort transmission mechanism 1006, a left shock absorber 1033, a second shock absorber 1034 and the pair of left and right front wheels 1003.

The pair of right and left front wheels 1003 includes a left front wheel 1031 and a right front wheel 1032. The left front wheel 1031 is disposed on the left of the down frame 1212 which defines a portion of the body frame 1021 in the left-and-right direction of the body frame 1021. The right front wheel 1032 is disposed on the right of the down frame 1212 which defines a portion of the body frame 1021 in the left-and-right direction of the body frame 1021. The left front wheel 1031 and the right front wheel 1032 are aligned side by side in the left-and-right direction of the body frame 1021 when the vehicle 1001 is viewed from the front thereof with the body frame 1021 being in the upright state. Additionally, a left front mudguard 1227 is disposed directly above the left front wheel 1031. A right front mudguard 1228 is disposed directly above the right front wheel 1032. The left front wheel 1031 is supported by the left shock absorber 1033. The right front wheel 1032 is supported by the right shock absorber 1034.

The left shock absorber 1033 is preferably a so-called telescopic shock absorber and absorbs vibrations caused by the left front wheel 1031 when the left front wheel 1031 receives a load from the road surface. The left shock absorber 1033 includes a left lower portion 1033a (a left outer element) and a left upper portion 1033b (a left inner element). The left shock absorber 1033 includes a left side member supporting portion 1053A. The left front wheel 1031 is supported by the left lower portion 1033a. The left lower portion 1033a extends in the up-and-down direction of the body frame 1021, and a left wheel axle 1314 is supported at a lower end thereof. The left wheel axle 1314 supports the left front wheel 1031. The left upper portion 1033b is disposed directly above the left lower portion 1033a with a portion thereof inserted in the left lower portion 1033a. The left shock absorber 1033 extends and contracts as a result of the left upper portion 1033b moving relative to the left lower portion 1033a in a direction in which the left lower portion 1033a extends. An upper portion of the left upper portion 1033b is fixed to a left bracket 1317. A lower portion of the left side member supporting portion 1053A is fixed to the left bracket 1317. The direction in which the left lower portion 1033a extends is a direction in which the left shock absorber 1033 extends and contracts.

The left lower portion 1033a and the left upper portion 1033b each include two telescopic elements. The two telescopic elements are aligned in the front-and-rear direction. The two telescopic elements are connected to each other. This prevents the left lower portion 1033a from turning relative to the left upper portion 1033b about an axis parallel to a direction in which the telescopic element extends and contracts.

The right shock absorber 1034 is preferably a so-called telescopic shock absorber and absorbs vibrations caused by the right front wheel 1032 when the right front wheel 1032 receives a load from the road surface. The right shock absorber 1034 includes a right lower portion 1034a (a right outer element) and a right upper portion 1034b (a right inner element). The right shock absorber 1034 includes a right side member supporting portion 1054A. The right front wheel 1032 is supported by the right lower portion 1034a. The right lower portion 1034a extends in the up-and-down direction of the body frame 1021, and a right wheel axle 1324 is supported at a lower end thereof. The right wheel axle 1324 supports the right front wheel 1032. The right upper portion 1034b is disposed directly above the right lower portion 1034a with a portion thereof inserted in the right lower portion 1034a. The right shock absorber 1034 extends and contracts as a result of the right upper portion 1034b moving relative to the right lower portion 1034a in a direction in which the right lower portion 1034a extends. An upper portion of the right upper portion 1034b is fixed to a right bracket 1327. A lower portion of the right side member supporting portion 1054A is fixed to the right bracket 1327. The direction in which the right lower portion 1034a extends is a direction in which the right shock absorber 1034 extends and contracts. The right lower portion 1034a and the right upper portion 1034b each include two telescopic elements. The two telescopic elements are aligned in the front-and-rear direction. The two telescopic elements are connected to each other. This prevents the right lower portion 1034a from turning relative to the right upper portion 1034*b* about an axis parallel to a direction in which the telescopic element extends and contracts.

The steering effort transmission mechanism 1006 is disposed above the left front wheel 1031 and the right front wheel 1032 when the vehicle 1001 is viewed from the front thereof with the body frame 1021 being in the upright state. The steering effort transmission mechanism 1006 includes a steering member 1028 as a member which inputs steering effort applied by the rider. The steering member 1028 includes the steering shaft 1060 and a handlebar 1023 which is connected to an upper portion of the steering shaft 1060. The steering shaft 1060 is supported on the headstock 1211 at a portion thereof so as to turn. An upper portion of the steering shaft 1060 is positioned farther rearwards of the body frame 1021 than a lower portion thereof. A turning axis of the steering shaft 1060 extends rearwards and upwards of the body frame 1021. The steering shaft 1060 turns in association with the rider operating the handlebar 1023.

The steering effort transmission mechanism 1006 includes the steering member 1028, a tie-rod 1067, the left bracket 1317 and the right bracket 1327. The steering effort transmission mechanism 1006 transmits steering effort by which the rider operates the handlebar 1023 to the left bracket 1317 and the right bracket 1327.

In the present preferred embodiment, the link mechanism 1005 preferably uses a four-joint parallel link (also, referred to as a parallelogram link) system.

The link mechanism 1005 is disposed below the handlebar 1023 when the vehicle 1001 is viewed from the front thereof with the body frame 1021 being in the upright state. The link mechanism 1005 is supported by the headstock 1211 of the body frame 1021. The link mechanism 1005 includes an upper cross member 1051, a lower cross member 1052, a left side member 1053 and a right side member 1054.

The upper cross member 1051 includes a plate-shaped member 1512 which is disposed directly ahead of the headstock 1211 and which extends in a vehicle's width direction. The plate-shaped member 1512 is supported on the headstock 1211 at a middle portion thereof by a support portion C. The support portion C is a boss portion which is provided on the headstock 1211. The upper cross member 1051 is able to turn relative to the headstock 1211 about a middle upper axis which extends in the front-and-rear direction of the body frame 1021. The upper cross member 1051 is able to turn relative to the body frame 1021 about the middle upper axis which extends in the front-and-rear direction of the body frame 1021. The upper cross member 1051 is able to turn relative to the body frame 1021 about the middle upper axis which extends forwards in the front-and-rear direction of the body frame 1021 and upwards in the up-and-down direction of the body frame 1021.

A left end of the upper cross member 1051 is supported on the left side member 1053 by a support portion D. The support portion D is a boss portion which is provided on the left side member 1053. The upper cross member 1051 is able to turn relative to the left side member 1053 about a left upper axis which extends in the front-and-rear direction of the body frame 1021. A right end of the upper cross member 1051 is supported on the right side member 1054 by a support portion E. The support portion E is a boss portion which is provided on the right side member 1054. The upper cross member 1051 is able to turn relative to the right side member 1054 about a right upper axis which extends in the front-and-rear direction of the body frame 1021. The middle upper axis, the left upper axis and the right upper axis are parallel to one another. The middle upper axis, the left upper axis and the right upper axis extend forwards in the front-and-rear direction of the body frame 1021 and upwards in the up-and-down direction of the body frame 1021.

The lower cross member 1052 is supported on the headstock 1211 at a middle portion thereof by a support portion F. The support portion F is a boss portion which is provided on the headstock 1211. The lower cross member 1052 is able to turn relative to the headstock 1211 about a middle lower axis which extends in the front-and-rear direction of the body frame 1021. The lower cross member 1052 is able to turn relative to the body frame 1021 about the middle lower axis which extends in the front-and-rear direction of the body frame 1021. The lower cross member 1052 is able to turn relative to the body frame 1021 about the middle upper axis which extends forwards in the front-and-rear direction of the body frame 1021 and upwards in the up-and-down direction of the body frame 1021. The lower cross member 1052 is disposed below the upper cross member 1051 in the up-and-down direction of the body frame when the vehicle is viewed from the front thereof with the body frame being in the upright state. The lower cross member 1052 has substantially the same length as that of the upper cross member 1051 in the vehicle's width direction. The lower cross member 1052 is disposed parallel to the upper cross member 1051.

The lower cross member 1052 includes a pair of plate-shaped members 1522, 1522 which extend in a left-and-right direction of the vehicle 1001. The pair of plate-shaped members 1522, 1522 is disposed individually directly ahead of and behind the headstock 1211 in the front-and-rear direction of the body frame 1021. The pair of plate-shaped members 1522, 1522 is connected integrally to each other by a connecting portion 1523. The connecting portion 1523 may be integral with or separate from the pair of plate-shaped members 1522, 1522. A left end of the lower cross member 1052 is supported on the left side member 1053 by a support portion G. The support portion G is a boss portion which is provided on the left side member 1053. The lower cross member 1052 is able to turn relative to the left side member 1053 about a left lower axis which extends in the front-and-rear direction of the body frame 1021. A right end of the lower cross member 1052 is supported on the right side member 1054 by a support portion H. The support portion H is a boss portion which is provided on the right side member 1054. The lower cross member 1052 is able to turn relative to the right side member 1054 about a right lower axis which extends in the front-and-rear direction of the body frame 1021. The middle lower axis, the left lower axis and the right lower axis are parallel to one another. The middle lower axis, the left lower axis and the right lower axis extend forwards in the front-and-rear direction of the body frame 1021 and upwards in the up-and-down direction of the body frame 1021.

At least a portion of the link mechanism 1005 is able to turn about the middle axes which extend in the front-and-rear direction of the vehicle 1001. At least a portion of the link mechanism 1005 is able to turn about the middle axes (turning axes) which extend forwards in the front-and-rear direction of the body frame 1021 and upwards in the up-and-down direction of the body frame 1021. The middle axes (turning axes) lean relative to the horizontal direction. The middle axes (turning axes) lean forwards and upwards relative to the horizontal direction.

The left side member 1053 is disposed directly on the left of the headstock 1211. The left side member 1053 is provided above the left front wheel 1031 and the left shock absorber 1033. The left side member 1053 supports the left side member supporting portion 1053A on an inner circumference thereof so as to turn. The left shock absorber 1033 is able to turn relative to the left side member 1053 about a left center axis Y1. The left center axis Y1 is provided parallel to a turning axis of the headstock 1211.

The right side member 1054 is disposed directly on the right of the headstock 1211. The right side member 1054 is provided above the right front wheel 1032 and the right shock absorber 1034. The right side member 1054 supports the right side member supporting portion 1054A on an inner circumference thereof so as to turn. The right shock absorber 1034 is able to turn relative to the right side member 1054 about a right center axis Y2. The right center axis Y2 is provided parallel to the turning axis of the headstock 1211.

In this way, the upper cross member 1051, the lower cross member 1052, the left side member 1053 and the right side member 1054 are supported so that the upper cross member 1051 and the lower cross member 1052 maintain parallel postures to each other, and the left side member 1053 and the right side member 1054 maintain parallel postures to each other.

Figure 4:
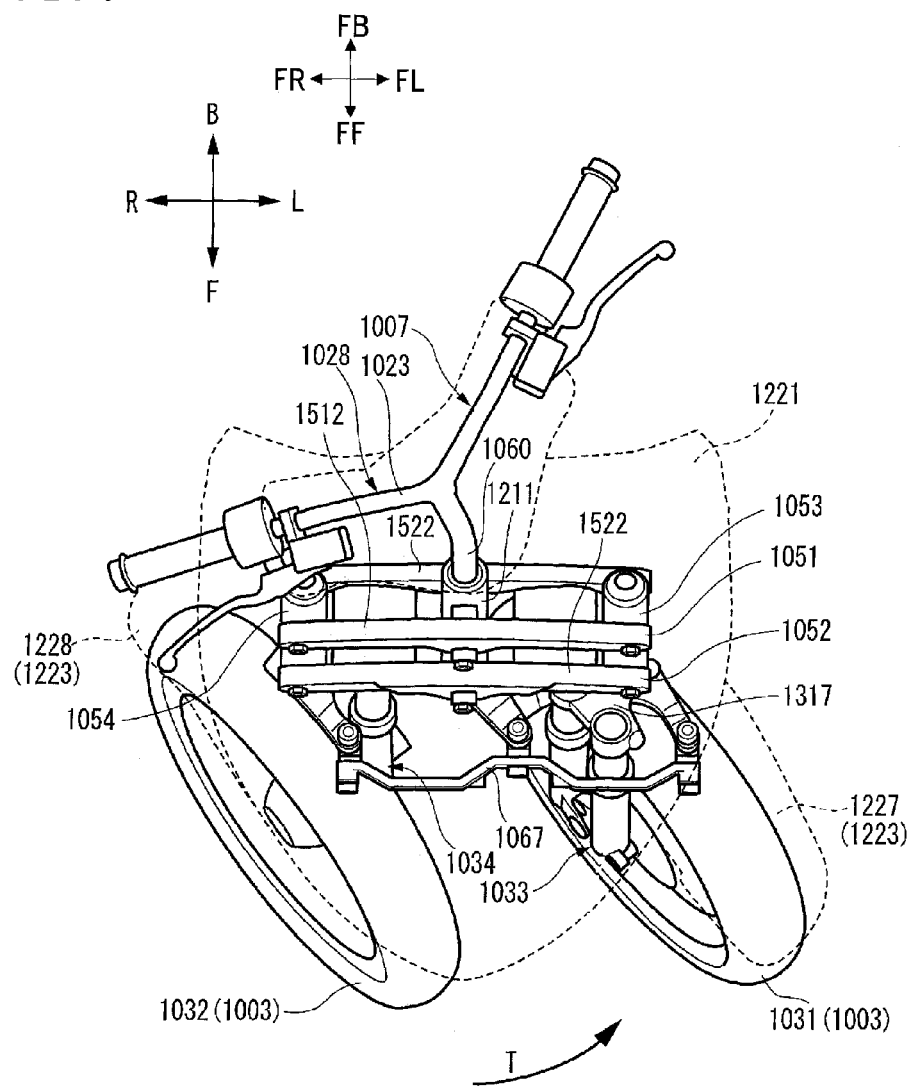
FIG. 4 is a plan view of the front portion of the vehicle in a state where the vehicle shown in FIG. 1 is steered.

FIG. 4 is a plan view of the front portion of the vehicle resulting when the vehicle 1001 is steered to be turned, depicting a steering operation of the vehicle 1001. FIG. 4 is a view of the vehicle as viewed from above in the up-and-down direction of the body frame 1021 when the pair of left and right front wheels 1003 are steered to be turned with the body frame 1021 being in the upright state.

As shown in FIG. 4 when the handlebar 1023 is turned, the steering effort transmission mechanism 1006 of the steering mechanism 1007 is activated such that a steering operation is performed.

For example, when the steering shaft 1060 turns in a direction indicated by an arrow T in FIG. 4, the tie-rod 1067 moves left rearwards. The left bracket 1317 and the right bracket 1327 turn in the direction indicated by the arrow T as the tie-rod 1067 moves left rearwards. When the left bracket 1317 and the right bracket 1327 turn in the direction indicated by the arrow T, the left front wheel 1031 turns about the left center axis Y1 (see FIG. 2), and the right front wheel 1032 turns about the right center axis Y2 (see FIG. 2).

Figure 5:
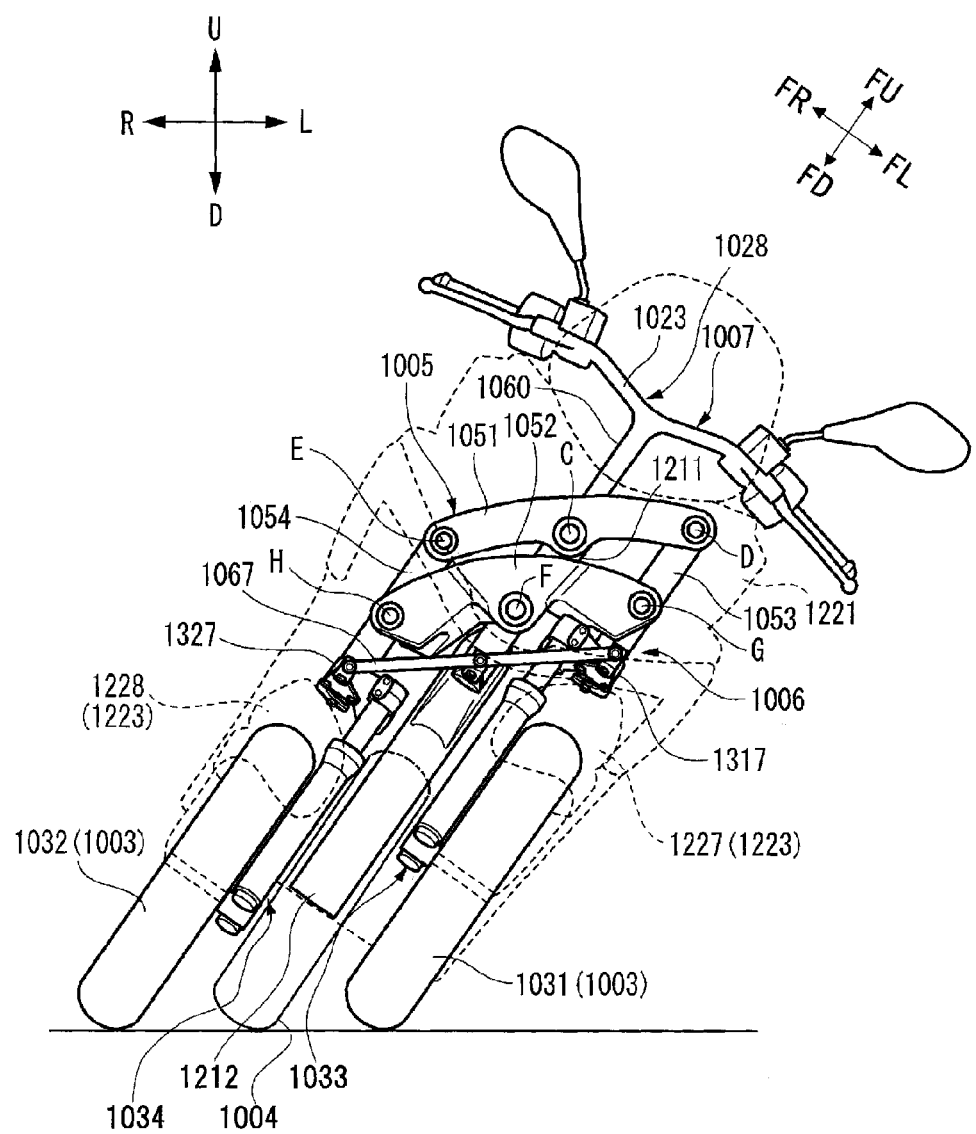
FIG. 5 is a front view of the front portion of the vehicle in a state where the vehicle shown in FIG. 1 is caused to lean.

FIG. 5 is a front view of a vehicle front portion with the vehicle 1001 caused to lean, illustrating a leaning operation of the vehicle 1001. FIG. 5 is a view of the vehicle 1001 with the body frame 1021 leaning to the left of the vehicle 1001 as viewed from the front thereof in the front-and-rear direction of the vehicle 1001 (the front-and-rear direction of the body frame 1021).

The link mechanism 1005 preferably has a rectangular shape when looking at the vehicle 1001 with the body frame 1021 being in the upright state from the front thereof. The link mechanism 1005 preferably has a parallelogram shape when looking at the vehicle with the body frame 1021 leaning to the left of the vehicle 1001 from the front thereof. The deformation of the link mechanism 1005 causes the leaning of the body frame 1021 in the left-and-right direction thereof. The operation of the link mechanism 1005 means that the members of the link mechanism 1005 which are designed to lean (the upper cross member 1051, the lower cross member 1052, the left side member 1053 and the right side member 1054) turn relatively about their support points as turning axes so as to change the shape of the link mechanism 1005.

In the link mechanism 1005 of the present preferred embodiment, for example, the upper cross member 1051, the lower cross member 1052, the left side member 1053 and the right side member 1054, which are disposed substantially in a rectangular shape when the vehicle 1001 which is in the upright state is seen from the front thereof, are deformed substantially into the parallelogram shape when the vehicle 1001 leans. The left front wheel 1031 and the right front wheel 1032 also lean in the left-and-right direction of the vehicle as leaning of the body frame 1021 triggers.

For example, when the rider causes the vehicle 1001 to lean to the left of the vehicle 1001, the headstock 1211 leans to the left from the vertical direction. When the headstock 1211 leans, the upper cross member 1051 turns about the support portion C relative to the headstock 1211, while the lower cross member 1052 turns about the support portion F relative to the headstock 1211. Then, the upper cross member 1051 moves farther leftwards than the lower cross member 1052, and the left side member 1053 and the right side member 1054 lean from the vertical direction while being kept parallel to the headstock 1211. When the left side member 1053 and the right side member 1054 lean, the left side member 1053 and the right side member 1054 turn relative to the upper cross member 1051 and the lower cross member 1052. Consequently, when the vehicle 1001 is caused to lean, the left front wheel 1031 and the right front wheel 1032 which are supported on the left side member 1053 and the right side member 1054, respectively, lean from the vertical direction while being kept parallel to the headstock 1211 as the left side member 1053 and the right side member 1054 lean.

The tie-rod 1067 maintains its parallel posture relative to the upper cross member 1051 and the lower cross member 1052 even though the vehicle 1001 leans.

In this way, the link mechanism 1005 which leans to cause the left front wheel 1031 and the right front wheel 1032 to lean is disposed directly above the left front wheel 1031 and the right front wheel 1032. Namely, turning shafts of the upper cross member 1051, the lower cross member 1052, the left side member 1053 and the right side member 1054 which define the link mechanism 1005 are disposed above the left front wheel 1031 and the right front wheel 1032.

Figure 6:
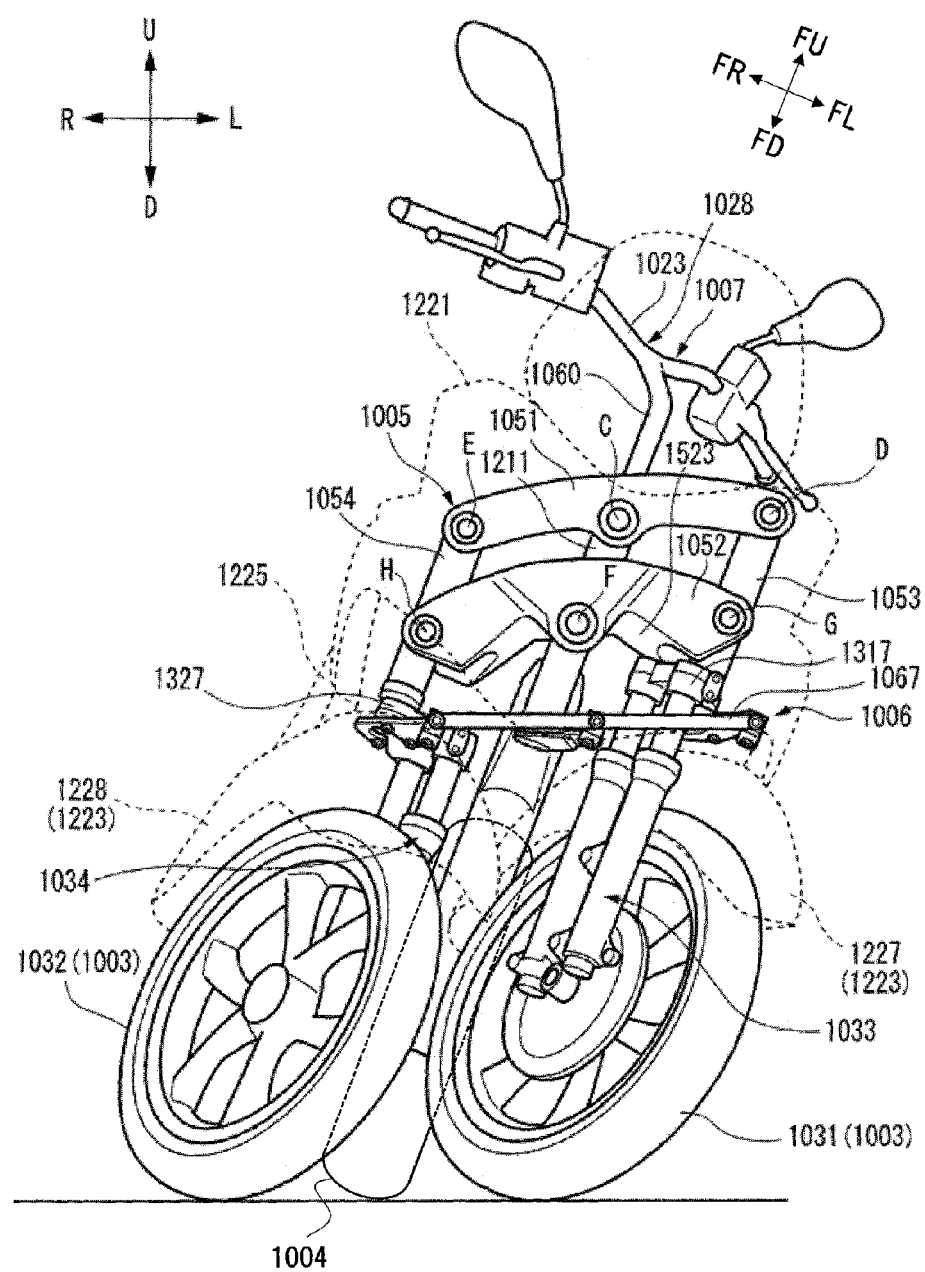
FIG. 6 is a front view of the front portion of the vehicle in a state where the vehicle shown in FIG. 1 is steered and is caused to lean.

FIG. 6 is a front view of the front portion of the vehicle with the vehicle 1001 steered to be turned and caused to lean. FIG. 6 shows a state in which the vehicle 1001 is steered to the left while being caused to lean to the left. FIG. 6 is a view of the vehicle 1001 as viewed from the front thereof in the front-and-rear direction of the vehicle 1001 (the front-and-rear direction of the body frame 1021) with the pair of left and right front wheels 1003 steered to be turned in such a state that the body frame 1021 leans to the left of the vehicle 1001. When the vehicle 1001 operates in the way described in FIG. 6, as a result of the vehicle being steered as shown therein, the left front wheel 1031 and the right front wheel 1032 change their directions and, as a result of the body frame 1021 leaning in the way described above, the left front wheel 1031 and the right front wheel 1032 lean together with the body frame 1021. In this state, the upper cross member 1051, the lower cross member 1052, the left side member 1053 and the right side member 1054 of the link mechanism 1005 are deformed into the parallelogram shape, and the tie-rod 1067 moves to the left or right in the direction in which the vehicle 1001 is steered (to the left in FIG. 6) and to the rear.

Figure 7:
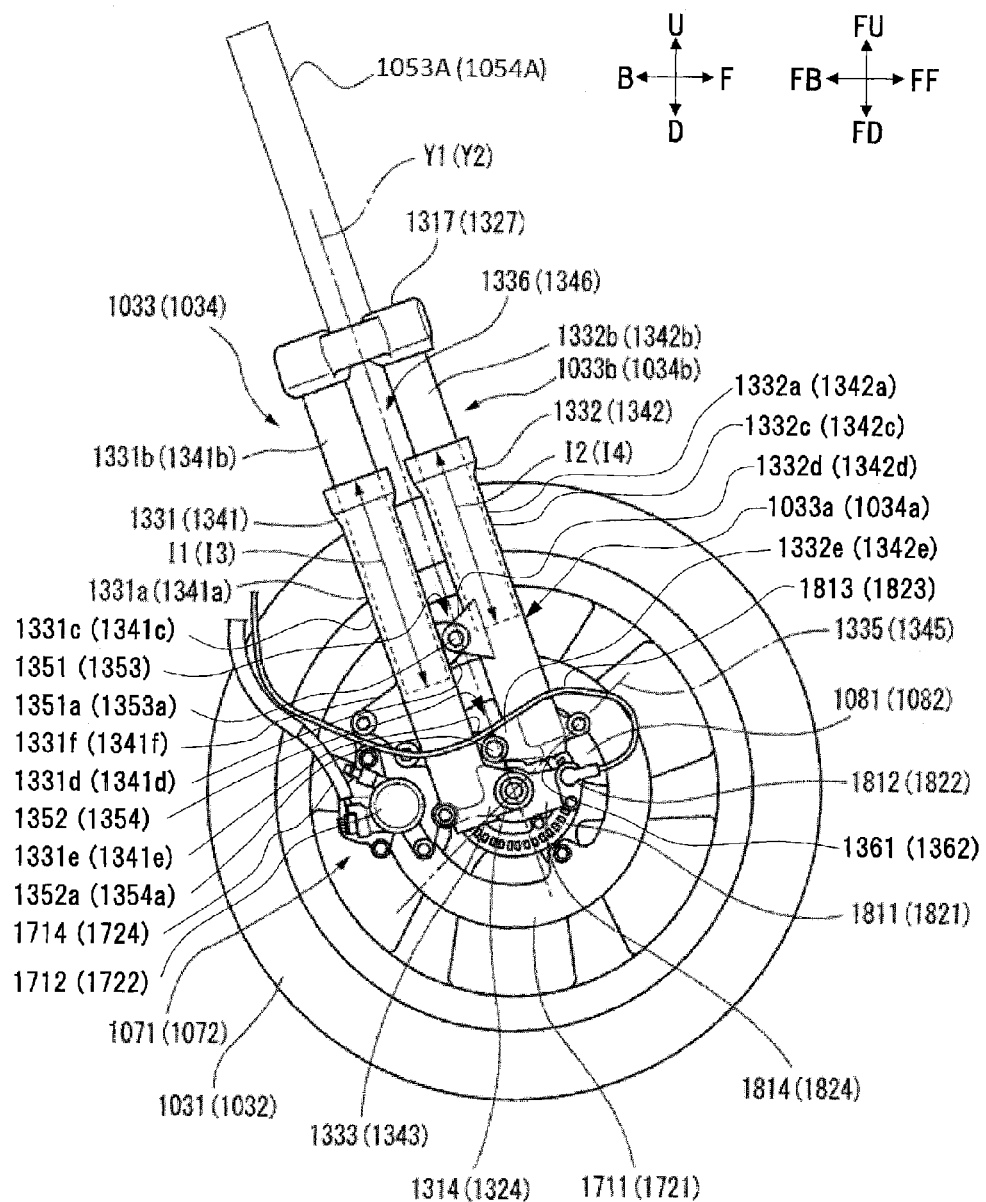
FIG. 7 is a side view of a left shock absorber of the vehicle shown in FIG. 1.

FIG. 7 is a side view of the left shock absorber 1033 as viewed from a right side of the vehicle 1001 shown in FIG. 1. FIG. 7 is a side view of the left shock absorber 1033 as viewed from a rotating axis of the left front wheel 1031 which is supported by the left shock absorber 1033. In FIG. 7, the left shock absorber 1033 is shown. The right shock absorber 1034 is not shown therein. In the present preferred embodiment, however, the right front wheel 1032 and the right shock absorber 1034 are laterally symmetrical with the left front wheel 1031 and the left shock absorber 1033. Because of this, the reference numerals of the right front wheel 1032 and the right shock absorber 1034 are also given additionally to those of the left front wheel 1031 and the left shock absorber 1033 shown in FIG. 7. Hereinafter, referring to FIG. 7, portions of the right front wheel 1032 and the right shock absorber 1034 will also be described.

The left shock absorber 1033 includes the left lower portion 1033*a* (the left outer element) and the left upper portion 1033*b* (the left inner element) as shown in FIG. 7. The left shock absorber 1033 includes a left side member supporting portion 1053A. The left lower portion 1033*a* and the left upper portion 1033*b* include a left rear telescopic element 1331 and a left front telescopic element 1332 which are connected together while being aligned in the front-and-rear direction. The left shock absorber 1033 includes the left rear telescopic element 1331, the left front telescopic element 1332, the left side member supporting portion 1053A and the left bracket 1317 (a body supporting portion, an inner connecting portion). The left rear telescopic element 1331 extends and contracts in which the left rear telescopic element 1331 extends and contracts in the direction of the left center axis Y1. The left rear telescopic element 1331 includes an elastic member (omitted from illustration) such as a spring or the like and a shock absorbing member (omitted from illustration) such as oil or the like which are provided in an interior thereof. The left rear telescopic element 1331 performs a damper function to absorb vibrations or impacts generated by a load which the left front wheel 1031 receives from the road surface. The left front telescopic element 1332 is disposed on the same side as the side of the left front wheel 1031 where the left rear telescopic element 1331 is disposed in the direction of the rotating axis of the left wheel axle 1314. The left rear telescopic element 1331 and the left front telescopic element 1332 are aligned in the front-and-rear direction of the vehicle 1001 directly on the right of the left front wheel 1031 with the vehicle 1001 being in the upright state. The left front telescopic element 1332 is disposed directly ahead of the left rear telescopic element 1331. The left front telescopic element 1332 extends and contracts in which the left front telescopic element 1332 extends and contracts in the direction of the left center axis Y1. The extending and contracting direction of the left rear telescopic element 1331 and the extending and contracting direction of the left front telescopic element 1332 are parallel as viewed from the direction of the rotating axis of the left front wheel 1031. Upper portions of the left rear telescopic element 1331 and the left front telescopic element 1332 are connected together by the left bracket 1317. A lower end portion of the left front telescopic element 1332 is fixedly connected to the vicinity of a lower end portion of the left rear telescopic element 1331. The left wheel axle 1314 of the left front wheel 1031 is supported at a left wheel axle supporting portion 1333 (a wheel supporting portion) which is provided at the lower end portion of the left rear telescopic element 1331. The left front wheel 1031 is supported on the left bracket 1317 by the two telescopic elements of the left rear telescopic elements 1331 and the left front telescopic element 1332 which are aligned in the front-and-rear direction of the vehicle. This prevents the left lower portion 1033*a* from turning relative to the left upper portion 1033*b* about an axis parallel to a direction in which the telescopic element extends and contracts.

The left bracket 1317 is positioned directly below the front cover 1221 of the body cover 1022 when the vehicle 1001 is viewed from above with the body frame 1021 being in the upright state.

The left front telescopic element 1332 is shorter than the left rear telescopic element 1331 in the extending and contracting direction thereof. A left wheel axle supporting portion 1333 which supports the left wheel axle 1314 is disposed below the lower end portion of the left front telescopic element 1332. The left wheel axle supporting portion 1333 which supports the left wheel axle 1314 is disposed below the left front telescopic element 1332. The left center axis Y1 is positioned between a left rear outer member 1331*a* (a left rear outer portion) and a left front outer member 1332*a* (a left front outer portion). The left wheel axle supporting portion 1333 is provided on the left rear telescopic element 1331. The left wheel axle supporting portion 1333 is provided on the left rear outer member 1331*a*. It is possible to replace the positions of the left rear telescopic element 1331 and the left front telescopic element 1332 in relation to the front-and-rear direction of the vehicle 1001 by rotating them reversely about the left center axis Y1.

The left rear telescopic element 1331 includes a left rear inner member 1331*b* (a left rear inner portion) and a left rear outer member 1331*a*. The left rear inner member 1331*b* defines an upper portion of the left rear telescopic element 1331. The left rear outer member 1331*a* defines a lower portion of the left rear telescopic element 1331. The left rear inner member 1331*b* is inserted into the left rear outer member 1331*a* at a lower portion thereof so as to move relatively. The left front telescopic element 1332 includes a left front inner member 1332*b* (a left front inner portion) and a left front outer member 1332*a*. The left front inner member 1332*b* defines an upper portion of the left front telescopic element 1332. The left front outer member 1332*a* defines a lower portion of the left front telescopic element 1332. The left front inner member 1332*b* is inserted into the left front outer member 1332*a* at a lower portion thereof so as to move relatively. In the left rear telescopic element 1331, a length of a portion where the left rear inner member 1331*b* is inserted into the left rear outer member 1331*a* is referred to as a left rear insertion length I1. In the left front telescopic element 1332, a length of a portion where the left front inner member 1332*b* is inserted into the left front outer member 1332*a* is referred to as a left front insertion length I2. In such a state that the left shock absorber 1033 extends to its maximum extent, the left rear insertion length I1 of the left rear telescopic element 1331 is longer than the left front insertion length I2 of the left front telescopic element 1332.

In the event that a vibration or impact is applied thereto from the left front wheel 1031, in the left rear telescopic element 1331, the left rear outer member 1331*a* moves in the extending and contracting direction relative to the left rear inner member 1331*b*. In the event that a vibration or impact is applied thereto from the left front wheel 1031, in the left front telescopic element 1332, the left front outer member 1332*a* moves in the extending and contracting direction relative to the left front inner member 1332*b*.

The left rear outer member 1331*a* includes a left rear outer main body portion 1331*c* (a left rear outer portion), a left rear upper support portion 1331*d*, a left rear lower support portion 1331*e*, a caliper supporting portion 1331*f* and a left wheel axle supporting portion 1333. The left front outer member 1332*a* (the left front outer portion) includes a left front outer main body portion 1332*c*, a left front upper support portion 1332*d*, and a left front lower support portion 1332e. The left rear outer main body portion 1331c allows the left rear inner member 1331b to be inserted thereinto in the extending and contracting direction. The left front outer main body portion 1332c allows the left front inner member 1332b to be inserted thereinto in the extending and contracting direction. The left rear upper support portion 1331d and the left rear lower support portion 1331e are disposed directly ahead of the left rear outer main body portion 1331c so as to be aligned in the extending and contracting direction of the left rear telescopic element 1331. The left front upper support portion 1332d and the left front lower support portion 1332e are disposed directly ahead of the left front outer main body portion 1332c so as to be aligned in the extending and contracting direction of the left front telescopic element 1332. The caliper supporting portion 1331f is disposed behind the left rear outer main body portion 1331c. The left wheel axle supporting portion 1333 is provided at a lower portion of the left rear outer main body portion 1331c in the extending and contracting direction of the left rear telescopic element 1331.

The left rear inner member 1331b and the left front inner member 1332b are connected together. The left rear inner member 1331b and the left front inner member 1332b are connected together by the left bracket 1317. The left rear inner member 1331b and the left front inner member 1332b are connected together at their upper end portions by the left bracket 1317. The left rear outer member 1331a and the left front outer member 1332a are connected together by a plurality of connecting portions. The left rear outer member 1331a and the left front outer member 1332a are connected together at a left upper connecting portion 1351 (an outer connecting portion) and a left lower connecting portion 1352 (an outer connecting portion). The left upper connecting portion 1351 and the left lower connecting portion 1352 are aligned in the extending and contracting direction of the left front telescopic element 1332. The left upper connecting portion 1351 is provided at a middle portion in the extending and contracting direction of the left front telescopic element 1332. The left lower connecting portion 1352 is provided at a lower end portion of the left front telescopic element 1332 in the extending and contracting direction thereof. The left wheel axle supporting portion 1333 is disposed below the left lower connecting portion 1352 in the extending and contracting direction of the left front telescopic element 1332. The left upper connecting portion 1351 includes a left rear upper supporting portion 1331d, a left front upper supporting portion 1332d, and a left upper connecting member 1351a which connects the left rear upper supporting portion 1331d and the left front upper supporting portion 1332d together. The left lower connecting member 1352 includes a left rear lower supporting portion 1331e, a left front lower supporting portion 1332e and a left lower connecting member 1352a. The left lower connecting member 1352a connects the left rear lower supporting portion 1331e and the left front lower supporting portion 1332e together.

The left front outer member 1332a is shorter than the left rear outer member 1331a in the extending and contracting direction of the left front telescopic element 1332. The left front inner member 1332b is shorter than the left rear inner member 1331b in the extending and contracting direction of the left front telescopic element 1332.

Referring to FIG. 7, portions of the right front wheel 1032 and the right shock absorber 1034 will also be described. The right shock absorber 1034 includes a right lower portion 1034a (a right outer element) and a right upper portion 1034b (a right inner element). The right shock absorber 1034 includes a right side member supporting portion 1054A. The right lower portion 1034a and the right upper portion 1034b are defined by the right rear telescopic element 1341 and the right front telescopic element 1342 which are aligned in the front-and-rear direction and are connected together. The right shock absorber 1034 includes the right rear telescopic element 1341, the right front telescopic element 1342, the right side member supporting portion 1054A and the right bracket 1327 (a body supporting portion, an inner connecting portion). The right rear telescopic element 1341 extends and contracts such that the right rear telescopic element 1341 extends and contracts in the direction of the right center axis Y2. An elastic member (omitted from illustration) such as a spring or the like and a damping member (omitted from illustration) such as oil or the like are provided in an interior of the right rear telescopic element 1341. The right rear telescopic element 1341 performs a damper function to absorb vibrations or impacts generated by a load which the right front wheel 1032 receives from the road surface. The right front telescopic element 1342 is disposed on the same side as the side of the right front wheel 1032 where the right rear telescopic element 1341 is disposed in the direction of the rotating axis of the right wheel axle 1324. The right rear telescopic element 1341 and the right front telescopic element 1342 are aligned in the front-and-rear direction of the vehicle 1001 directly on the right of the right front wheel 1032 with the vehicle 1001 being in the upright state. The right front telescopic element 1342 is disposed directly ahead of the right rear telescopic element 1341. The right front telescopic element 1342 extends and contracts such that the right front telescopic element 1342 extends and contracts in the direction of the right center axis Y2. The extending and contracting direction of the right rear telescopic element 1341 and the extending and contracting direction of the right front telescopic element 1342 are parallel as viewed from the direction of the rotating axis of the right front wheel 1032. Upper portions of the right rear telescopic element 1341 and the right front telescopic element 1342 are connected together by the right bracket 1327. A lower end portion of the right front telescopic element 1342 is fixedly connected to the vicinity of a lower end portion of the right rear telescopic element 1341. The right wheel axle 1324 of the right front wheel 1032 is supported on the right wheel axle supporting portion 1343 (the wheel supporting portion) which is provided at the lower end portion of the right rear telescopic element 1341. The right front wheel 1032 is supported on the right bracket 1327 by the two telescopic elements of the right rear telescopic element 1341 and the right front telescopic element 1342 which are aligned in the front-and-rear direction of the vehicle. This prevents the right lower portion 1034a from turning relative to the right upper portion 1034b about an axis parallel to a direction in which the telescopic element extends and contracts.

The right bracket 1327 is positioned directly below the front cover 1221 of the body cover 1022 when the vehicle 1001 is viewed from above with the body frame 1021 being in the upright state.

The right front telescopic element 1342 is shorter than the right rear telescopic element 1341 in the extending and contracting direction thereof. A right wheel axle supporting portion 1343 which supports rotatably the right wheel axle 1324 is disposed below the lower end portion of the right front telescopic element 1342. The right wheel axle supporting portion 1343 which supports rotatably the right wheel axle 1324 is disposed below the right front telescopic element 1342. The right center axis Y2 is positioned between a right rear outer member 1341*a* (a right rear outer portion) and a right front outer member 1342*a* (a right front outer portion). The right wheel axle supporting portion 1343 is provided on the right rear telescopic element 1341. The right wheel axle supporting portion 1343 is provided on the right rear outer member 1341*a*. It is possible to replace the positions of the right rear telescopic element 1341 and the right front telescopic element 1342 in relation to the front-and-rear direction of the vehicle 1001 by rotating them reversely about the right center axis Y2.

The right rear telescopic element 1341 includes a right rear inner member 1341*b* (a right rear inner portion) and a right rear outer member 1341*a*. The right rear inner member 1341*b* defines an upper portion of the right rear telescopic element 1341. The right rear outer member 1341*a* defines a lower portion of the right rear telescopic element 1341. The right rear inner member 1341*b* is inserted into the right rear outer member 1341*a* at a lower portion thereof so as to move relatively. The right front telescopic element 1342 includes a right front inner member 1342*b* (a right front inner portion) and a right front outer member 1342*a*. The right front inner member 1342*b* defines an upper portion of the right front telescopic element 1342. The right front outer member 1342*a* defines a lower portion of the right front telescopic element 1342. The right front inner member 1342*b* is inserted into the right front outer member 1342*a* at a lower portion thereof so as to move relatively. In the right rear telescopic element 1341, a length of a portion where the right rear inner member 1341*b* is inserted into the right rear outer member 1341*a* is referred to as a right rear insertion length I3. In the right front telescopic element 1342, a length of a portion where the right front inner member 1342*b* is inserted into the right front outer member 1342*a* is referred to as a right front insertion length I4. In such a state that the right shock absorber 1034 extends to its maximum extent, the right rear insertion length I3 of the right rear telescopic element 1341 is longer than the right front insertion length I4 of the right front telescopic element 1342.

In the event that a vibration or impact is applied thereto from the right front wheel 1032, in the right rear telescopic element 1341, the right rear outer member 1341*a* moves in the extending and contracting direction relative to the right rear inner member 1341*b*. In the event that a vibration or impact is applied thereto from the right front wheel 1032, in the right front telescopic element 1342, the right front outer member 1342*a* moves in the extending and contracting direction relative to the right front inner member 1342*b*.

The right rear outer member 1341*a* includes a right rear outer main body portion 1341*c* (a right rear outer portion), a right rear upper support portion 1341*d*, a right rear lower support portion 1341*e*, a caliper supporting portion 1341*f* and a right wheel axle supporting portion 1343. The right front outer member 1342*a* (the right front outer portion) includes a right front outer main body portion 1342*c*, a right front upper support portion 1342*d*, and a right front lower support portion 1342*e*. The right rear outer main body portion 1341*c* allows the right rear inner member 1341*b* to be inserted thereinto in the extending and contracting direction. The right front outer main body portion 1342*c* allows the right front inner member 1342*b* to be inserted thereinto in the extending and contracting direction. The right rear upper support portion 1341*d* and the right rear lower support portion 1341*e* are disposed directly ahead of the right rear outer main body portion 1341*c* so as to be aligned in the extending and contracting direction of the right rear telescopic element 1341. The right front upper support portion 1342*d* and the right front lower support portion 1342*e* are disposed directly behind the right front outer main body portion 1342*c* so as to be aligned in the extending and contracting direction of the right front telescopic element 1342. A caliper supporting portion 1341*f* is disposed behind the right rear outer main body portion 1341*c*. The right wheel axle supporting portion 1343 is provided at a lower portion of the right rear outer main body portion 1341*c* in the extending and contracting direction of the right rear telescopic element 1341.

The right rear inner member 1341*b* and the right front inner member 1342*b* are connected together. The right rear inner member 1341*b* and the right front inner member 1342*b* are connected together by the right bracket 1327. The right rear inner member 1341*b* and the right front inner member 1342*b* are connected together at their upper portions by the right bracket 1327. The right rear outer member 1341*a* and the right front outer member 1342*a* are connected together by a plurality of connecting portions. The right rear outer member 1341*a* and the right front outer member 1342*a* are connected together at a right upper connecting portion 1353 (an outer connecting portion) and a right lower connecting portion 1354 (an outer connecting portion). The right upper connecting portion 1353 and the right lower connecting portion 1354 are aligned in the extending and contracting direction of the right front telescopic element 1342. The right upper connecting portion 1353 is provided at a middle portion in the extending and contracting direction of the right front telescopic element 1342. The right lower connecting portion 1354 is provided at a lower end portion of the right front telescopic element 1342 in the extending and contracting direction thereof. The right wheel axle supporting portion 1343 is disposed below the right lower connecting portion 1354 in the extending and contracting direction of the right front telescopic element 1342. The right upper connecting portion 1353 includes a right rear upper supporting portion 1341*d*, a right front upper supporting portion 1342*d*, and a right upper connecting member 1353*a* which connects the right rear upper supporting portion 1341*d* and the right front upper supporting portion 1342*d* together. The right lower connecting member 1354 includes a right rear lower supporting portion 1341*e*, a right front lower supporting portion 1342*e* and a right lower connecting member 1354*a*. The right lower connecting member 1354*a* connects the right rear lower supporting portion 1341*e* and the right front lower supporting portion 1342*e* together.

The right front outer member 1342*a* is shorter than the right rear outer member 1341*a* in the extending and contracting direction of the right front telescopic element 1342. The right front inner member 1342*b* is shorter than the right rear inner member 1341*b* in the extending and contracting direction of the right front telescopic element 1342.

As shown in FIG. 7, the left front wheel 1031 includes a left front brake 1071. The left front brake 1071 generates a braking force on the left front wheel 1031. The left front brake 1071 includes a left brake disc 1711 and a left caliper 1712. The left brake disc 1711 preferably has a ring shape which is centered at the left wheel axle 1314. The left brake disc 1711 is fixed to the left front wheel 1031. The left caliper 1712 is provided on the left shock absorber 1033. The left caliper 1712 is fixed to a lower portion of the left rear telescopic element 1331 of the left shock absorber 1033. The left caliper 1712 is fixed to the caliper supporting portion 1331*f*. The left caliper 1712 is disposed directly behind the lower portion of the left rear telescopic element 1331 of the left shock absorber 1033. A left brake hose 1714 is connected to the left caliper 1712 at one end portion thereof. The left caliper 1712 receives a hydraulic pressure via the left brake hose 1714. The left caliper 1712 moves brake pads due to the hydraulic pressure which the left caliper 1712 has received. The brake pads are brought into contact with a right side surface and a left side surface of the left brake disc 1711. The left caliper 1712 brakes the rotation of the left brake disc 1711 by holding the left brake disc 1711 by the brake pads.

Referring to FIG. 7, portions of the right front wheel 1032 will also be described. The right front wheel 1032 includes a right front brake 1072. The right front brake 1072 generates a braking force on the right front wheel 1032. The right front brake 1072 includes a right brake disc 1721 and a right caliper 1722. The right brake disc 1721 preferably has a ring shape which is centered at the right wheel axle 1324. The right brake disc 1721 is fixed to the right front wheel 1032. The right caliper 1722 is provided on the right shock absorber 1034. The right caliper 1722 is fixed to a lower portion of the right rear telescopic element 1341 of the right shock absorber 1034. The right caliper 1722 is fixed to a caliper supporting portion 1341f. The right caliper 1722 is disposed directly behind the lower portion of the right rear telescopic element 1341 of the right shock absorber 1034. A right brake hose 1724 is connected to the right caliper 1722 at one end portion thereof. The right caliper 1722 receives a hydraulic pressure via the right brake hose 1724. The right caliper 1722 moves brake pads due to the hydraulic pressure which the right caliper 1722 has received. The brake pads are brought into contact with a left side surface and a right side surface of the right brake disc 1721. The right caliper 1722 holds the right brake disc 1721 with the brake pads to brake the rotation of the right brake disc 1721.

As shown in FIG. 7, a left wheel speed sensor 1081 (an example of a body part) includes a left sensor disc 1811 and a left detector 1812. The left sensor disc 1811 preferably has a ring shape which is centered at the left wheel axle 1314. The left sensor disc 1811 is smaller in diameter than the left brake disc 1711. The left sensor disc 1811 is disposed on an inner circumference of the left brake disc 1711. The left sensor disc 1811 is fixed to the left front wheel 1031. The left detector 1812 detects a rotation of the left sensor disc 1811 optically or magnetically. The left detector 1812 generates an electric signal which changes according to the rotating speed of the left sensor disc 1811. Alternatively, the left detector 1812 changes the electric signal according to the rotating speed of the left sensor disc 1811. The left detector 1812 includes a left sensor cord 1813. An electric signal generated or changed in the left detector 1812 is transmitted to the controller byway of the left sensor cord 1813. A rotating wheel speed of the left front wheel 1031 is calculated based on the electric signal in the left detector 1812 which is transmitted by way of the left sensor cord 1813.

A left sensor stay 1814 is fixed to the left wheel axle supporting portion 1333. The left detector 1812 of the left wheel speed sensor 1081 is supported on the left sensor stay 1814. The left sensor stay 1814 has enough rigidity for the detection accuracy of the left detector 1812 of the left wheel speed sensor 1081 to be maintained even though the left shock absorber 1033 vibrates while the vehicle 1001 is running.

When looking at the left front wheel 1031 from the center in the vehicle's width direction, the left shock absorber 1033 includes a left area 1336 which is defined by the left rear telescopic element 1331, the left front telescopic element 1332, the left bracket 1317, and an imaginary line 1335 which connects the lower end portion of the left rear telescopic element 1331 and the lower end portion of the left front telescopic element 1332. The left detector 1812 of the left wheel speed sensor 1081 is disposed outwards of the left area 1336. The left detector 1812 is disposed below the left area 1336. The left detector 1812 is disposed ahead of the left area 1336. The left detector 1812 is disposed above the lower end portion of the left rear telescopic element 1331.

As viewed from the direction of the rotating axis of the left front wheel 1031 which is supported by the left wheel axle supporting portion 1333, a step portion 1361 is defined by the left rear telescopic element 1331 and the left front telescopic element 1332. The step portion 1361 is defined by the left rear outer member 1331a (the left rear outer portion) and the left front outer member 1332a (the left front outer portion). The left sensor stay 1814 is disposed at the step portion 1361.

As viewed from the direction of the rotating axis of the left front wheel 1031 which is supported by the left wheel axle supporting portion 1333, the left detector 1812 of the left wheel speed sensor 1081 is disposed ahead of the left caliper 1712. The left detector 1812 of the left wheel speed sensor 1081 is disposed ahead of the left wheel axle 1314. The left detector 1812 is disposed at least partially directly below the left front telescopic element 1332 in the extending and contracting direction of the left front telescopic element 1332.

Referring to FIG. 7, portions of the right front wheel 1032 will also be described. A right wheel speed sensor 1082 (an example of a body structure) includes a right sensor disc 1821 and a right detector 1822. The right sensor disc 1821 preferably has a ring shape which is centered at the right wheel axle 1324. The right sensor disc 1821 is smaller in diameter than the right brake disc 1721. The right sensor disc 1821 is disposed on an inner circumference of the right brake disc 1721. The right sensor disc 1821 is fixed to the right front wheel 1032. The right detector 1822 detects a rotation of the right sensor disc 1821 optically or magnetically. The right detector 1822 generates an electric signal which changes according to the rotating speed of the right sensor disc 1821. Alternatively, the right detector 1822 changes the electric signal according to the rotating speed of the right sensor disc 1821. The right detector 1822 includes a right sensor cord 1823. An electric signal generated or changed in the right detector 1822 is transmitted to the controller by way of the right sensor cord 1823. A rotating wheel speed of the right front wheel 1032 is calculated based on the electric signal in the right detector 1822 which is transmitted by way of the right sensor cord 1823.

A right sensor stay 1824 is fixed to the right wheel axle supporting portion 1343. The right detector 1822 of the right wheel speed sensor 1082 is supported on the right sensor stay 1824. The right sensor stay 1824 has enough rigidity for the detection accuracy of the right detector 1822 of the right wheel speed sensor 1082 to be maintained even though the right shock absorber 1034 vibrates while the vehicle 1001 is running.

When looking at the right front wheel 1032 from the center in the vehicle's width direction, the right shock absorber 1034 includes aright area 1346 which is defined by the right rear telescopic element 1341, the right front telescopic element 1342, the right bracket 1327, and an imaginary line 1345 which connects the lower end portion of the right rear telescopic element 1341 and the lower end portion of the right front telescopic element 1342. The right detector 1822 of the right wheel speed sensor 1082 is disposed outwards of the right area 1346. The right detector 1822 is disposed below the right area 1346. The right detector 1822 is disposed ahead of the right area 1346. The right detector 1822 is disposed above the lower end portion of the right rear telescopic element 1341.

As viewed from the direction of the rotating axis of the right front wheel 1032 which is supported by the right wheel axle supporting portion 1343, a step portion 1362 is defined by the right rear telescopic element 1341 and the right front telescopic element 1342. The step portion 1362 is defined by the right rear outer member 1341*a* (the right rear outer portion) and the right front outer member 1342*a* (the right front outer portion). The right sensor stay 1824 is disposed at the step portion 1362.

As viewed from the direction of the rotating axis of the right front wheel 1032 which is supported by the right wheel axle supporting portion 1343, the right detector 1822 of the right wheel speed sensor 1082 is disposed ahead of the right caliper 1722. The right detector 1822 of the right wheel speed sensor 1082 is disposed ahead of the right wheel axle 1324. The right detector 1822 is disposed at least partially directly below the right front telescopic element 1342 in the extending and contracting direction of the right front telescopic element 1342.

Figure 8A:
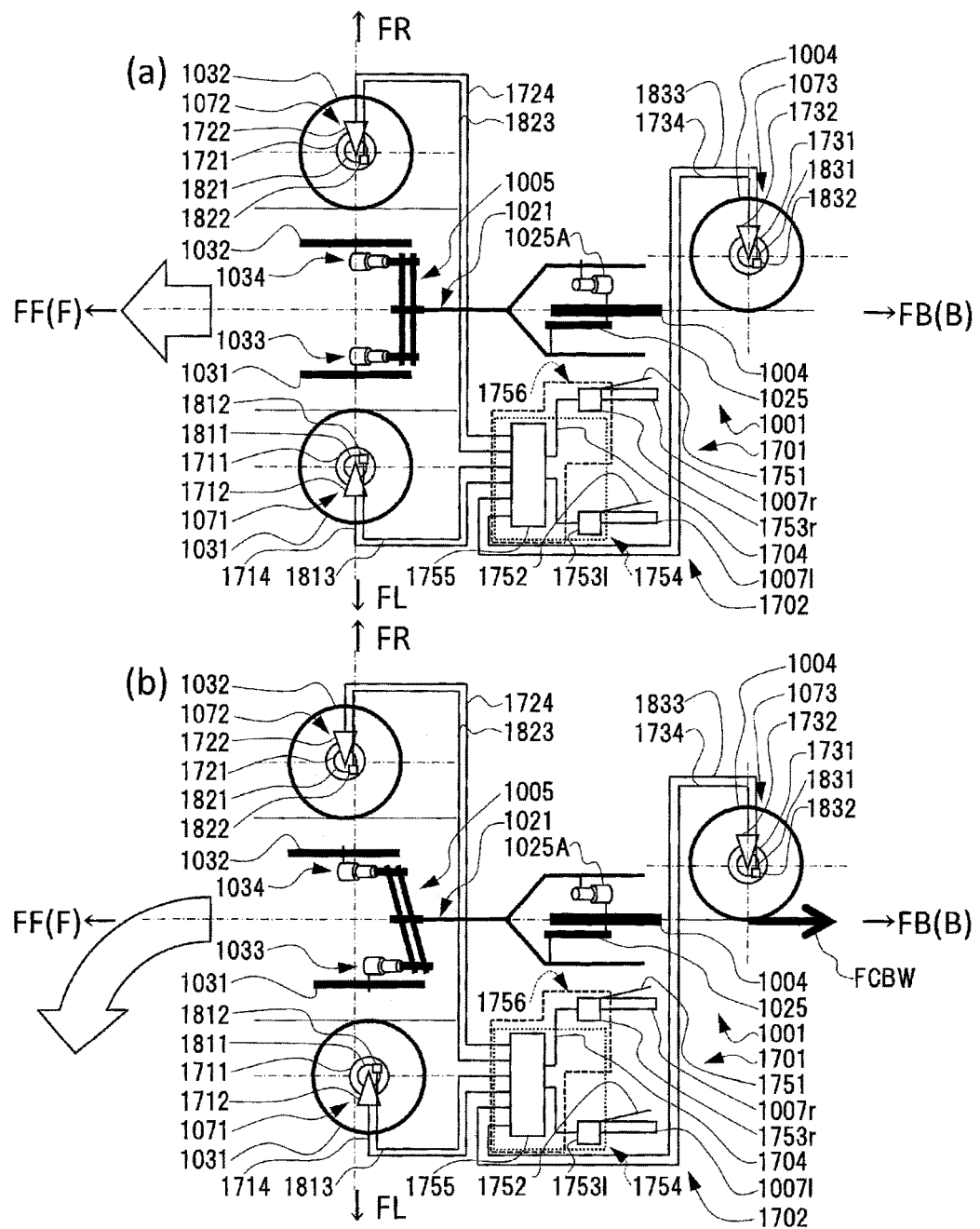
FIG. 8A are diagrams showing the vehicle and positions of the wheels in a front-and-rear direction as viewed from above in an up-and-down direction of a body frame.
Figure 8B:
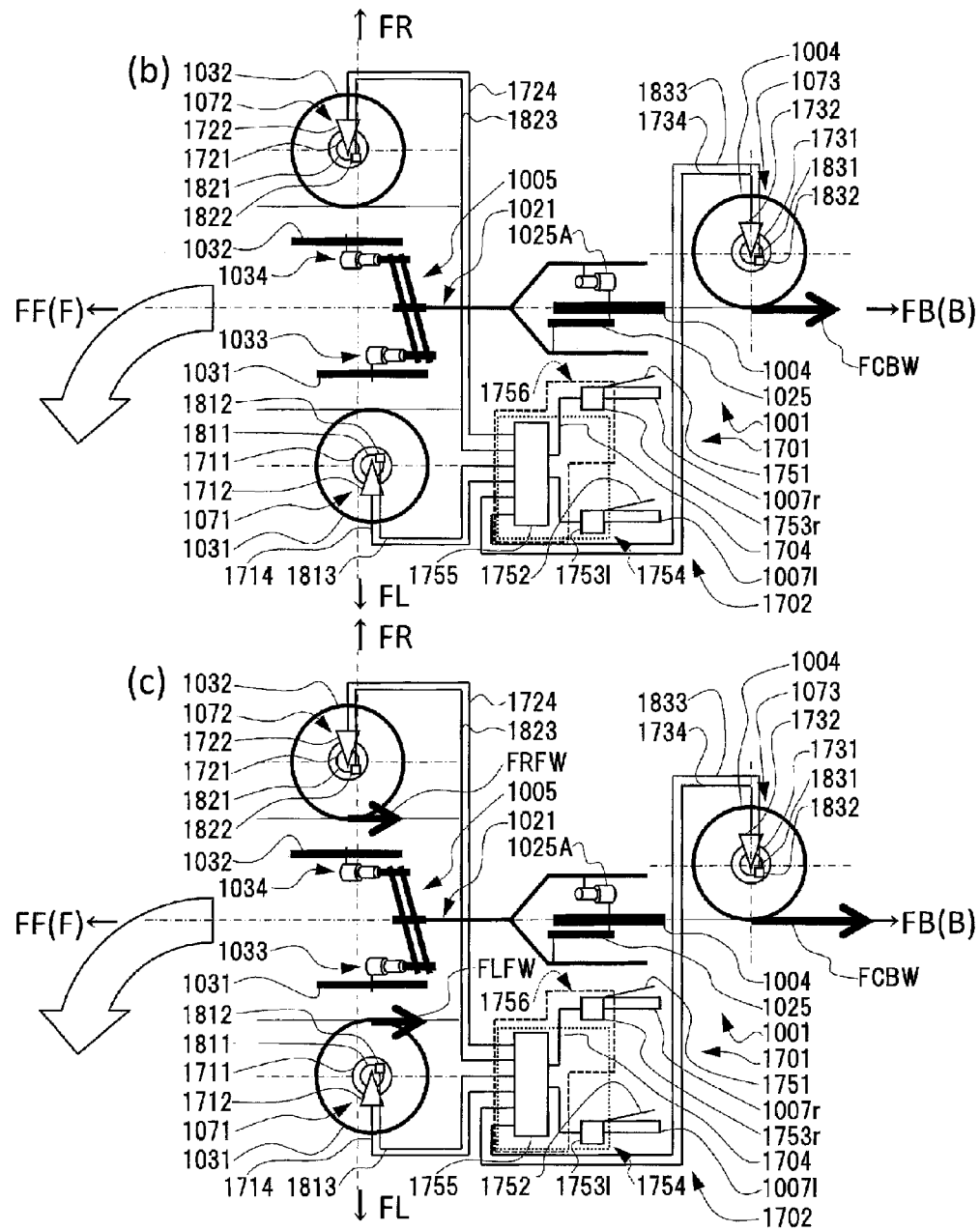
FIG. 8B are diagrams showing the vehicle and positions of the wheels in a front-and-rear direction as viewed from above in an up-and-down direction of a body frame.
Figure 8C:
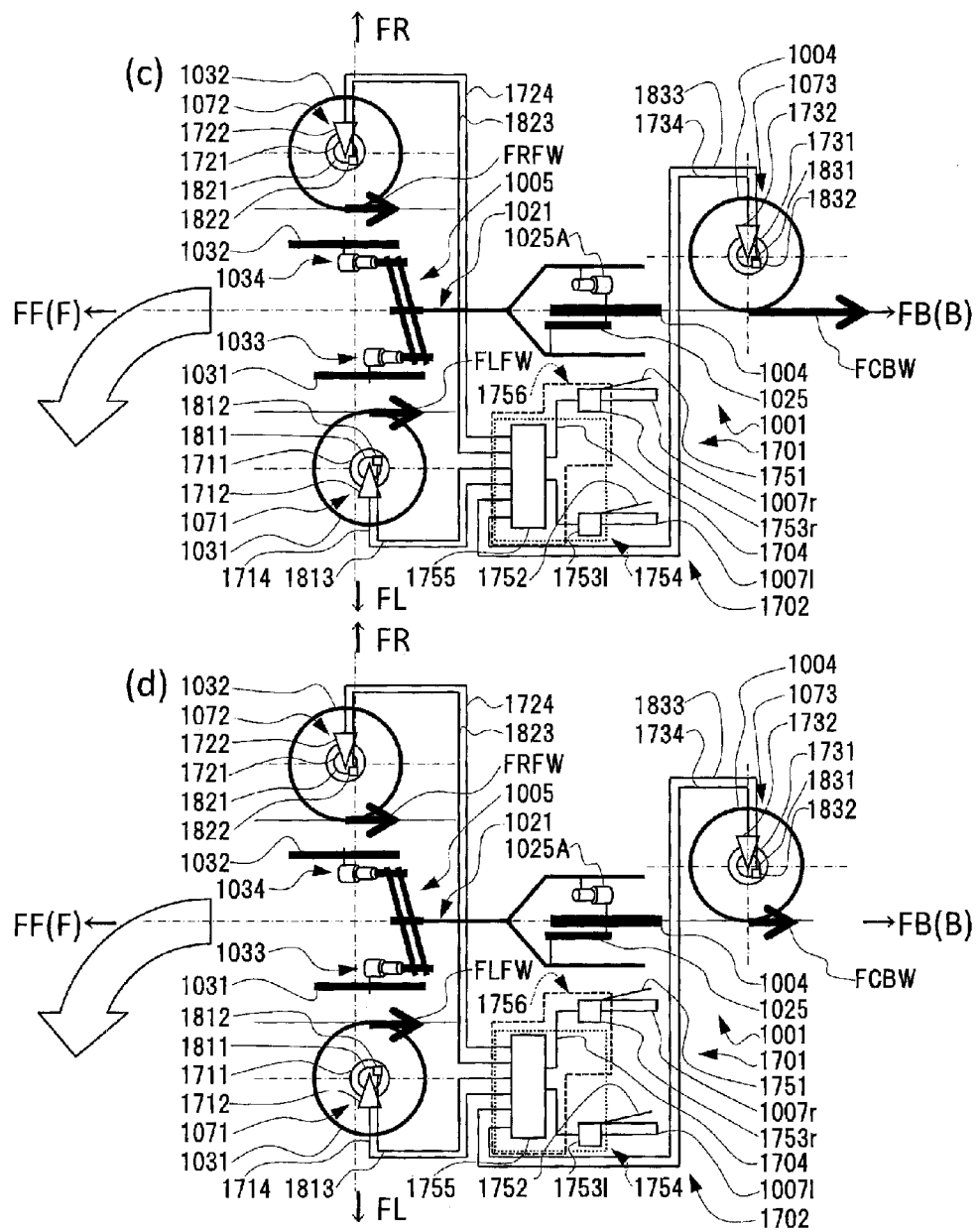
FIG. 8C are diagrams showing the vehicle and positions of the wheels in a front-and-rear direction as viewed from above in an up-and-down direction of a body frame.
Figure 8D:
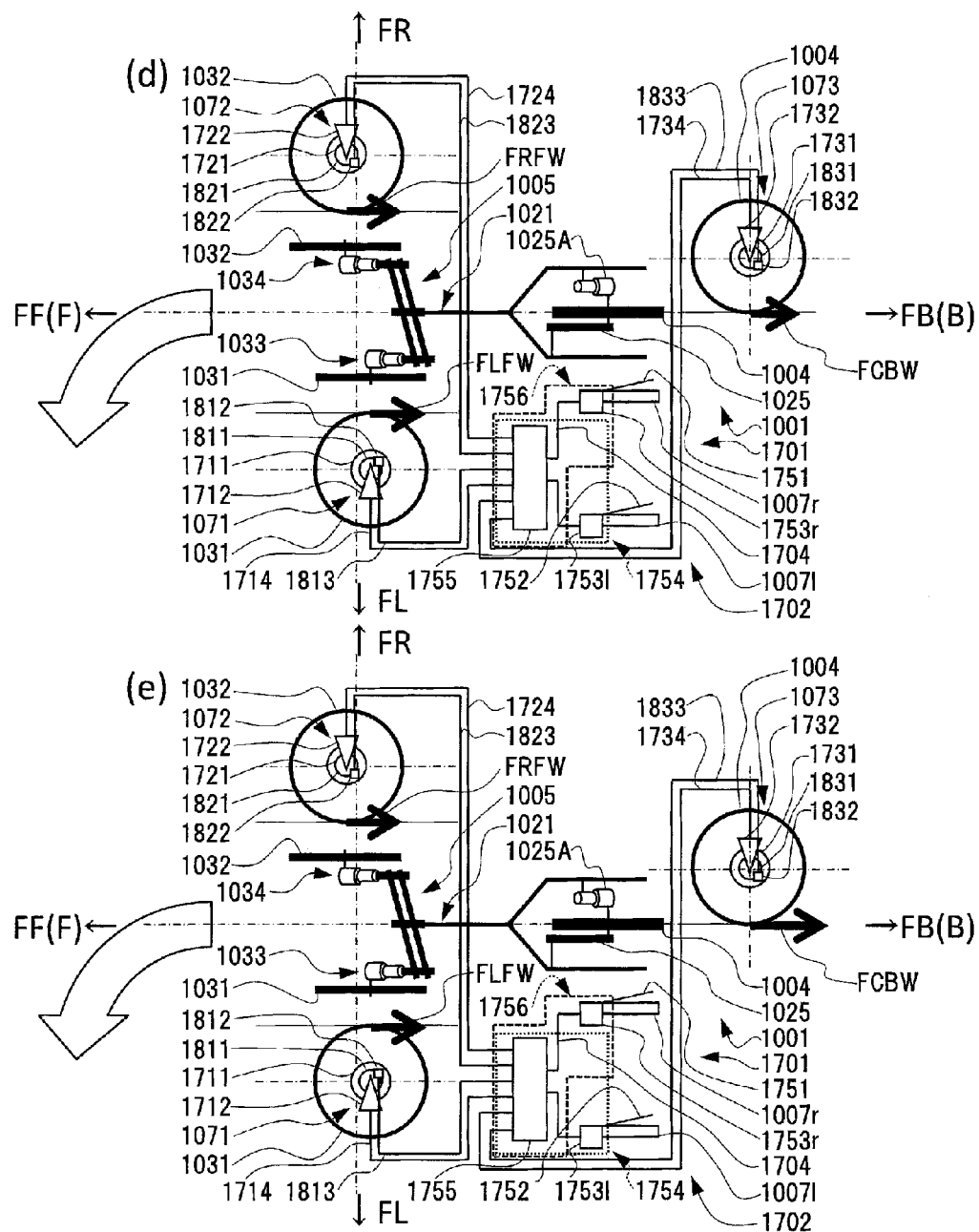
FIG. 8D are diagrams showing the vehicle and positions of the wheels in a front-and-rear direction as viewed from above in an up-and-down direction of a body frame.

FIGS. 8A, 8B, 8C, 8D, 8E, 8F and 8G are diagrams showing the vehicle and positions of the wheels in the front-and-rear direction as viewed from above in the up-and-down direction of the body frame. In the following description, as a matter of convenience, there may be a situation in which FIGS. 8A to 8G are collectively referred to as FIG. 8. In the vehicle shown at (a) in FIG. 8A, the body frame is in the upright state. As this occurs, none of the brakes on the right front wheel, the left front wheel and the central rear wheel is in operation. The vehicle shown at (b) of FIGS. 8A and 8B is turning with the body frame leaning to the left in the left-and-right direction of the vehicle. As this occurs, although neither of the brakes on the right front wheel and the left front wheel is in operation, the brake on the central rear wheel is in operation. The vehicle shown at (c) of FIGS. 8B and 8C is turning with the body frame leaning to the left in the left-and-right direction of the vehicle. As this occurs, the brakes on the right front wheel and the left front wheel are in operation. To facilitate the understanding of FIG. 8, (b) is shown in both FIGS. 8A and 8B, (c) is shown in both FIGS. 8B and 8C, and (d) is shown in both FIGS. 8C and 8D.

(a) in FIG. 8A shows the vehicle of which the body frame is in the upright state. As this occurs, none of the brakes on the right front wheel, the left front wheel and the central rear wheel is in operation. The vehicle 1001 includes a brake system 1701. The vehicle 1001 includes the body frame 1021. The vehicle 1001 includes the right front wheel 1032 and the left front wheel 1031 which are aligned side by side in the left-and-right direction of the body frame 1021 when the vehicle 1001 with the body frame 1021 being in the upright state is viewed from the front thereof. The vehicle 1001 includes the central rear wheel 1004 which is provided behind the right front wheel 1032 and the left front wheel 1031 in the front-and-rear direction of the body frame 1021 and which is disposed between the right front wheel 1032 and the left front wheel 1031 when the vehicle 1001 with the body frame 1021 being in the upright state is viewed from the front thereof. The right shock absorber 1034 supports the right front wheel 1032 at the lower portion thereof. The right shock absorber 1034 absorbs an upward displacement of the right front wheel 1032 in the up-and-down direction of the body frame 1021. The left shock absorber 1033 supports the left front wheel 1031 at the lower portion thereof. The left shock absorber 1033 absorbs an upward displacement of the left front wheel 1031 in the up-and-down direction of the body frame 1021. The link mechanism 1005 is provided above the right front wheel 1032 and the left front wheel 1031 in the up-and-down direction of the body frame 1021 when the vehicle with the body frame 1021 being in the upright state is viewed from the front thereof. The link mechanism 1005 supports the upper portion of the right shock absorber 1034 and the upper portion of the left shock absorber 1033 so as to turn. At least a portion of the link mechanism 1005 is supported on the body frame 1021 so as to turn about a turning axis which extends forwards in the front-and-rear direction of the body frame 1021 and upwards in the up-and-down direction of the body frame 1021. The brake system 1701 includes the right front brake 1072 which is provided on the right front wheel 1032 and which generates the braking force on the right front wheel 1032. The brake system 1701 includes the left front brake 1071 which is provided on the left front wheel 1031 and which generates the braking force on the left front wheel 1031. The brake system 1701 includes the central rear brake 1073 which is provided on the central rear wheel 1004 and which generates a braking force on the central rear wheel 1004. The brake system 1701 includes an input member 1752 which the rider who rides the vehicle 1001 operates with his or her hand. The input member 1752 preferably has a lever shape. The brake system 1701 includes a brake activator 1754. The brake activator 1754 activates the right front brake 1072, the left front brake 1071 and the central rear brake 1073. The input member 1752 is operated from an initial state to a maximum operated state by the rider. By being operated as a result of operation of the input member 1752, the right front brake 1072, the left front brake 1071 and the central rear brake 1073 are activated (refer to (a) in FIG. 8A).

The brake activator 1754 operates in the following manner as a result of operation of the input member 1752 at least when the vehicle is turning with the body frame 1021 leaning to the left of the vehicle 1001. The brake activator 1754 activates the central rear brake 1073 when an operation quantity of the input member 1752 from the initial state thereof is a first operation quantity. A braking force FCBW is generated in the central rear wheel 1004 (refer to (b) in FIGS. 8A and 8B). The brake activator 1754 activates the right front brake 1072 which is provided on the right front wheel 1032 which defines an outer wheel having a larger turning radius when the operation quantity of the input member 1752 from the initial state thereof is a second operation quantity which is greater than the first operation quantity. A braking force FRFW is generated in the right front wheel 1032. The input member 1752 activates the left front brake 1071 which is provided on the left front wheel 1031 which defines an inner wheel having a smaller turning radius when the operation quantity of the input member 1752 from the initial state thereof is a third operation quantity which is the same as or greater than the second operation amount. A braking force FLFW is generated in the left front wheel 1031. As this occurs, the braking force FCBW in the central rear wheel 1004 is increasing (refer to (c) of FIGS. 8B and 8C). The right front wheel 1032 which defines the outer wheel and the left front wheel 1031 which defines the inner wheel may be configured so that braking forces are generated therein simultaneously after the braking force is generated in the central rear wheel 1004. In this case, the second operation quantity becomes the same as the third operation quantity.

The operation quantity from the initial state to the maximum operated state is divided equally into three portions which are defined as three areas of a low braking force area LBFR, a middle braking force area and MBFR and a high braking force area HBFR. The first operation quantity, the second operation quantity and the third operation quantity are all included in the low braking force area. FRFW+FLFW which is a sum of braking forces which are generated in both the right front wheel 1032 which defines the outer wheel and the left front wheel 1031 which defines the inner wheel as a result of operation of the input member 1752 is smaller than the braking force FCBW which is generated in the central rear wheel 1004 (refer to (c) of FIGS. 8B and 8C). The brake activator 1754 is preferably operated thereafter in such a way as to increase the FRFW+FLFW which is the sum of the braking forces which are generated in both the right front wheel 1032 which defines the outer wheel and the left front wheel 1031 which defines the inner wheel as a result of operation of the input member so as to be greater than the braking force FCBW which is generated in the central rear wheel 1004. The brake activator 1754 is preferably operated thereafter in such a manner that the braking force FRFW generated in the right front wheel 1032 which defines the outer wheel becomes smaller than the braking force FLFW generated in the left front wheel 1031 which defines the inner wheel. The brake activator 1754 may be set so that a difference between the braking forces generated in the inner wheel and the outer wheel becomes small. As this occurs, it is preferable that the difference in braking force is not more than 50% of the greater braking force. At (b) to (j) in FIG. 8, the vehicle is illustrated as turning to the left with the body frame 1021 leaning to the left of the vehicle. In the case of the vehicle turning to the right with the body frame 1021 leaning to the right of the vehicle, the front wheels which define the inner wheel and the outer wheel function in the reverse manner. Right and left and inner and outer in the description made above should be read in a reverse manner. The others basically remain the same.

The low braking force area LBFR is the area which is one of the three areas into which the operation quantity from the initial state to the maximum operated state is equally divided where a total braking force of the braking force of the right front brake 1072, the braking force of the left front brake 1071 and the braking force of the central rear brake 1073 is small. The middle braking force area MBFR is the area which is another of the three areas into which the operation quantity from the initial state to the maximum operated state is equally divided where the total braking force of the braking force of the right front brake 1072, the braking force of the left front brake 1071 and the braking force of the central rear brake 1073 is almost in the middle. The high braking force area HBFR is the area which is the other of the three areas into which the operation quantity from the initial state to the maximum operated state is equally divided where the total braking force of the braking force of the right front brake 1072, the braking force of the left front brake 1071 and the braking force of the central rear brake 1073 is large. The low braking force area LBFR is the area which includes the initial state of the operation quantity of the input member 1752. The high braking force area HBFR is the area which includes the maximum operated state of the operation quantity of the input member 1752. The low braking force area LBFR is the area where the operation quantity of the input member 1752 is smaller than that of the middle braking force area MBFR. The middle braking force area MBFR is the area where the operation quantity of the input member 1752 is smaller than that of the high braking force area HBFR.

The brake system 1701 includes a central rear wheel slip detector 1832 that detects a slipping condition at the central rear wheel 1004. The brake system 1701 includes a brake activator 1754 which operates in the following manner. The brake activator 1754 operates in the following manner at least while the vehicle is turning with the body frame 1021 leaning in the left-and-right direction of the vehicle and while the central rear brake 1073, the right front brake 1072 and the left front brake 1071 are in operation as a result of operation of the input member 1752 and in such a state that both the front wheels of the right front wheel 1032 and the left front wheel 1031 are not slipping. In the state shown at (c) in FIGS. 8B and 8C, when a slipping condition is detected at the central rear wheel 1004 based on a signal detected by the central rear detector 1832, the braking force FCBW in the central rear wheel 1004 reduces (refer to (d) in FIGS. 8C and 8D). Thereafter, the brake activator 1754 controls the operating condition of the central rear brake 1073 based on the signal detected by the central rear detector 1832 so as to reduce the braking force FCBW in the central rear wheel 1004 lower than a braking force which is obtained as a result of operation of the input member 1752 (refer to (e) in FIGS. 8D and 8E). The braking force which is obtained as a result of operation of the input member 1752 is the braking force FCBW in the central rear wheel 1004 which is shown at (c) in FIGS. 8B and 8C. In other words, the braking force which is obtained as a result of operation of the input member 1752 is the braking force which is originally obtained according to the operation quantity of the input member 1752 when a slipping condition is detected at the central rear wheel 1004 based on the signal detected by the central rear detector 1832 in such a state that the central rear wheel 1004 is not slipping. In this state, when the operation quantity of the input member 1752 is increased as a result of operation of the input member 1752 and changes the operating conditions of both the right front brake 1072 and the left front brake 1071, the brake activator 1754 increases both the braking force FRFW in the right front wheel 1032 and the braking force FLFW in the left front wheel 1031 according to the operation quantity of the input member 1752 (refer to (f) in FIG. 8).

The brake system 1701 includes the central rear detector 1832 which is a central rear wheel slip detector that detects a slipping condition as the central rear wheel 1004, the right detector 1822 which is a right front wheel slip detector that detects a slipping condition at the right front wheel 1032 and the left detector 1812 which is a left front wheel slip detector that detects a slipping condition at the left front wheel 1031. The brake system 1701 includes a brake activator 1754 which operates in the following manner. The brake activator 1754 operates in the following manner at least while the vehicle is turning with the body frame 1021 leaning in the left-and-right direction of the vehicle and while the central rear brake 1073, the right front brake 1072 and the left front brake 1071 are in operation as a result of operation of the input member 1752 and in such a state that a slipping condition is not detected at both the front wheels of the right front wheel 1032 and the left front wheel 1031 based on signals detected by the right detector 1822 and the left detector 1812. In the state shown at (c) in FIGS. 8B and 8C, when a slipping condition is detected at the central rear wheel 1004 based on a signal detected by the central rear detector 1832, the braking force FCBW in the central rear wheel 1004 is reduced (refer to (d) in FIGS. 8C and 8D). Thereafter, the brake activator 1754 controls the operating condition of the central rear brake 1073 based on the signal detected by the central rear detector 1832 so as to reduce the braking force FCBW in the central rear wheel 1004 to lower than a braking force which is obtained as a result of operation of the input member 1752 (refer to (e) in FIGS. 8D and 8E). The braking force which is obtained as a result of operation of the input member 1752 is the braking force FCBW in the central rear wheel 1004 which is shown at (c) in FIGS. 8B and 8C. In other words, the braking force which is obtained as a result of operation of the input member 1752 is the braking force which is originally obtained according to the operation quantity of the input member 1752 when a slipping condition is detected at the central rear wheel 1004 based on the signal detected by the central rear detector 1832 in such a state that the central rear wheel 1004 is not slipping. In this state, when the operation quantity of the input member 1752 is increased as a result of operation of the input member 1752 and changes the operating conditions of both the right front brake 1072 and the left front brake 1071, the brake activator 1754 increases both the braking force FRFW in the right front wheel 1032 and the braking force FLFW in the left front wheel 1031 according to the operation quantity of the input member 1752 (refer to (f) in FIG. 8E).

Figure 8E:
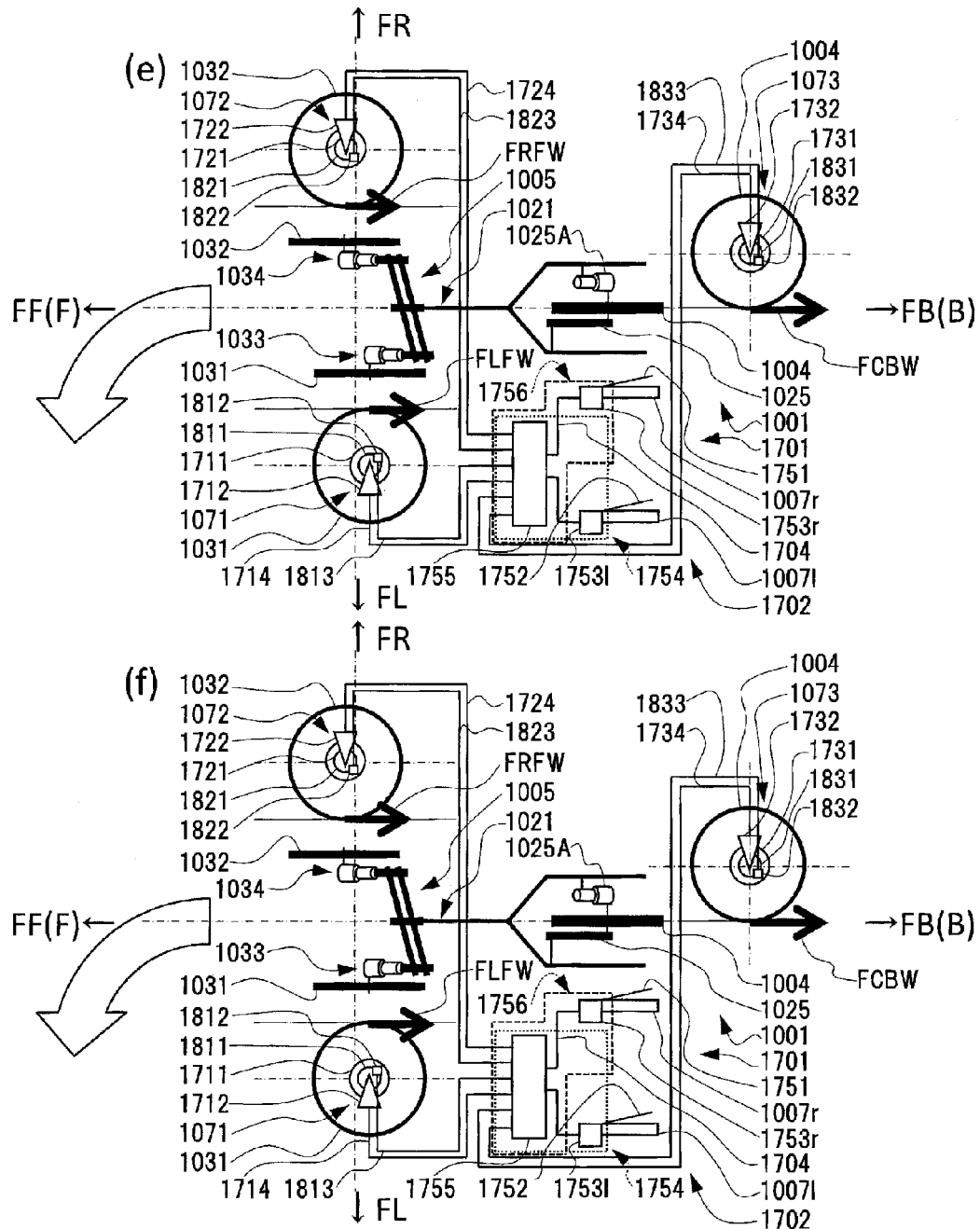
FIG. 8E are diagrams showing the vehicle and positions of the wheels in a front-and-rear direction as viewed from above in an up-and-down direction of a body frame.
Figure 8F:
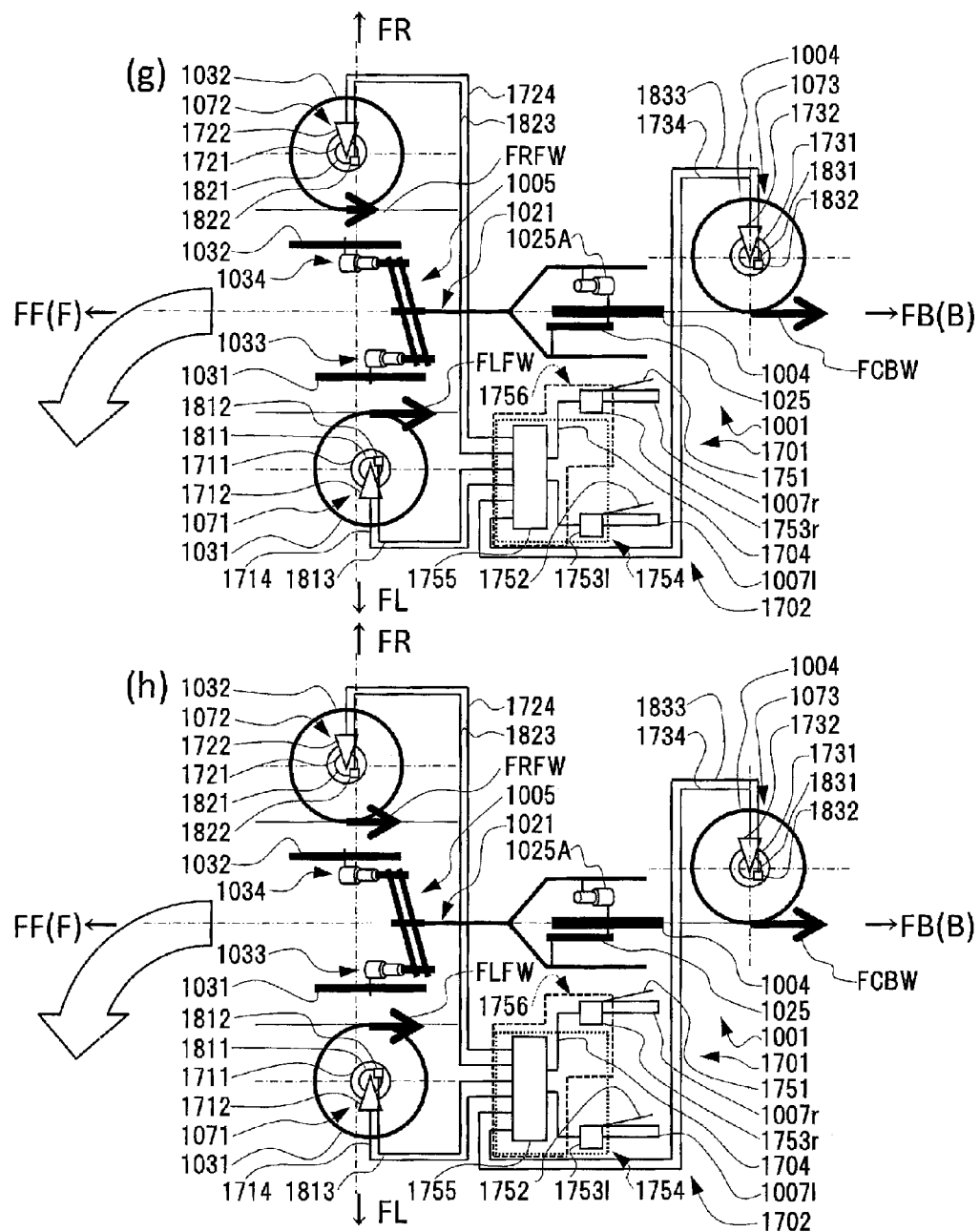
FIG. 8F are diagrams showing the vehicle and positions of the wheels in a front-and-rear direction as viewed from above in an up-and-down direction of a body frame.

Further, in the state shown at (f) in FIG. 8E, the brake activator 1754 preferably operates in the following manner. When a slipping condition is detected at one of the front wheels or either at the right front wheel 1032 or at the left front wheel 1031 based on signals which are detected by the right detector 1822 and the left detector 1812, the brake activator 1754 controls the operating conditions of the front brakes both the right front wheel 1032 and the left front wheel 1031 based on the signal detected by the front wheel slip detector of one of the front wheels or either the right front wheel 1032 or the left front wheel 1031 to reduce the braking forces in both the front wheels of the right front wheel 1032 and the left front wheel 1031 to lower than braking forces which are obtained as a result of operation of the input member 1752. When a slipping condition is detected at one of the front wheels or either at the right front wheel 1032 or at the left front wheel 1031 based on signals which are detected by the right detector 1822 and the left detector 1812, the brake activator 1754 controls the operating conditions of both the right front brake 1072 and the left front brake 1071 based on the signal detected by the front wheel slip detector of one of the front wheels to reduce the braking forces in both the right front wheel 1032 and the left front wheel 1031 to lower than braking forces which are obtained as a result of operation of the input member 1752. For example, in case the right front wheel 1032 which defines the outer wheel slips, the braking force FRFW in the right front wheel 1032 is reduced to be small (refer to (g) in FIG. 8F). As this occurs, the braking force FRFW in the right front wheel 1032 and the braking force FLFW in the left front wheel are preferably reduced to lower than braking forces which are obtained as a result of operation of the input member 1752 (refer to (h) in FIG. 8F).

Further, in the state shown at (f) in FIG. 8E, the brake activator 1754 preferably operates in the following manner. Although a slipping condition is detected at either the right front wheel 1032 or the left front wheel 1031 based on signals detected by the right detector 1822 and the left detector 1812, the brake activator 1754 does not change immediately the operating condition of the front brake of one of the front wheels based on the signal detected by the front wheel slip detector of one of the front wheels. Although a slipping condition is detected at either the right front wheel 1032 or the left front wheel 1031 based on signals detected by the right detector 1822 and the left detector 1812, the brake activator 1754 does not change immediately the operating condition of the right front brake 1072 or the left front brake 1071 which is provided on one of the front wheels based on the signal detected by the front wheel slip detector of one of the front wheel. For example, in case the right front wheel 1032 which defines the outer wheel slips, the braking force FRFW in the right front wheel 1032 is reduced to be small (refer to (i) in FIG. 8G). As this occurs, the braking force FLFW in the right front wheel 1032 and the braking force FLFW in the left front wheel do not change unless there is a change in the conditions of the road surfaces (refer to (i) in FIG. 8G).

Figure 8G:
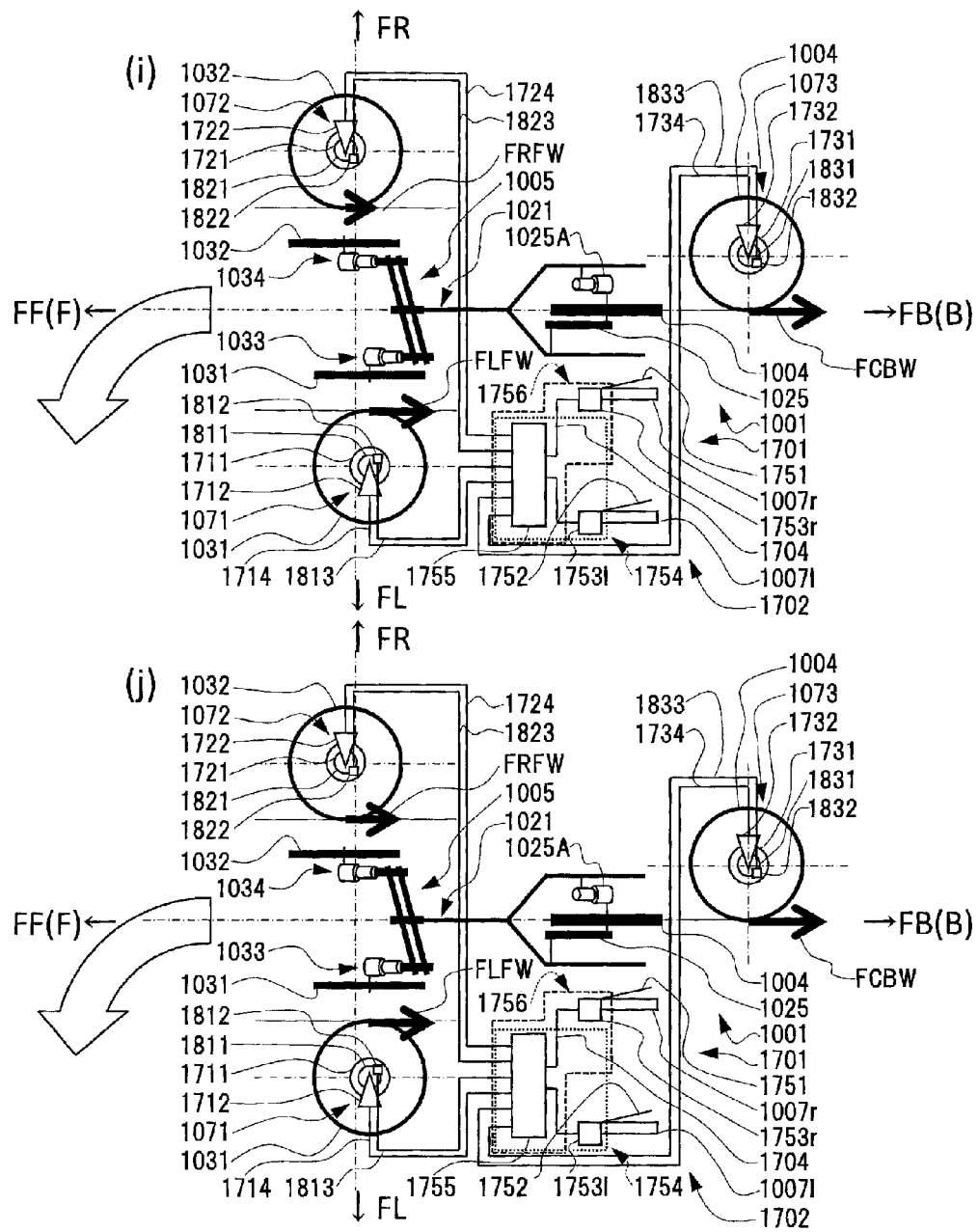
FIG. 8G are diagrams showing the vehicle and positions of the wheels in a front-and-rear direction as viewed from above in an up-and-down direction of a body frame.

In case the slipping condition at the right front wheel 1032 continues after the operating condition of the right front brake 1072 is held in such a state that the operating condition of the right front brake 1072 is not controlled in response to the slip at the right front wheel 1032, the brake activator 1754 preferably controls the operating condition of the right front brake 1072 so as to reduce the braking force FRFW in the right front wheel 1032 to lower than a braking force which is obtained as a result of operation of the input member 1751 (refer to (j) in FIG. 8G).

The operating condition of the right front brake 1072 is preferably controlled so as to reduce the braking force FRFW in the right front wheel 1032 to lower than a braking force which is obtained as a result of operation of the input member 1751 when the time during which the slipping condition continues at the right front wheel 1032 exceeds a predetermined value as a result of the slipping condition continuation time being counted.

The brake activator 1754 preferably controls the operating condition of the right front brake 1072 so as to reduce the braking force FRFW in the right front wheel 1032 to lower than a braking force which is obtained as a result of operation of the input member 1751 when a distance traveled or mileage covered by the vehicle since the slipping condition is detected at the right front wheel 1032 is counted to be determined to exceed a predetermined value. When referred to herein, the predetermined value is a value which is obtained in advance experimentally. The predetermined value is a value which is stored in the controller.

The brake activator 1754 preferably controls the operating condition of the right front brake 1072 not through an electric control but mechanically by a device after a predetermined length of time has elapsed since a slipping condition is detected at the right front wheel 1032 so as to increase the braking force FRFW in the right front wheel 1032 to reduce the braking force to lower than a braking force which is obtained as a result of operation of the input member 1751.

Further, in that state, the brake activator 1754 preferably operates in the following manner. At least while the vehicle is turning with the body frame 1021 leaning in the left-and-right direction of the vehicle, the brake activator 1754 activates first the central rear brake 1073 among the right front brake 1072, the left front brake 1071 and the central rear brake 1073 as a result of operation of the input member 1752 and activates last the front brake which is one of the right front brake 1072 and the left front brake 1071 which is provided on the front wheel which defines the inner wheel having the smaller turning radius. At least while the vehicle is turning with the body frame 1021 leaning in the left-and-right direction of the vehicle, the brake activator 1754 activates first the central rear brake 1073 among the right front brake 1072, the left front brake 1071 and the central rear brake 1073 as a result of operation of the input member 1752 and activates last one of the right front brake 1072 and the left front brake 1071 which is provided on the front wheel which defines the inner wheel having the smaller turning radius. The brake activator 1754 preferably activates the other of the right front brake 1072 and the left front brake 1071 which is provided on the front wheel which defines the outer wheel and one of the right front brake 1072 and the left front brake 1071 which is provided on the front wheel which defines the inner wheel simultaneously (refer to (c) in FIGS. 8B and 8C).

The vehicle 1001 includes the brake system 1701. The brake system 1701 includes the input member 1752. The brake system 1701 includes a brake activator 1754. The brake activator 1754 includes a rear master cylinder 17531. When the input member 1752 is controlled by the rider, the rear master cylinder 17531 is activated to generate a hydraulic pressure. The hydraulic pressure generated is transmitted to a hydraulic pressure controller 1755 via the brake hose. The hydraulic pressure controller 1755 transmits a hydraulic pressure corresponding to the hydraulic pressure transmitted thereto to a central rear caliper 1732 by way of a rear brake hose 1734. This activates the central rear brake 1073. The hydraulic pressure controller 1755 transmits the hydraulic pressure corresponding to the hydraulic pressure transmitted thereto to the right caliper 1722 by way of the right brake hose 1724. This activates the right front brake 1072. The hydraulic pressure controller 1755 transmits the hydraulic pressure corresponding to the hydraulic pressure transmitted thereto to the left caliper 1712 by way of the left brake hose 1714. This activates the left front brake 1071.

The input member 1752 is preferably a lever. The input member 1752 is a lever which oscillates between the initial state and the maximum operated state. The initial state is a state where no control is made by the rider. For example, the operation amount may be a position of the lever. The maximum operated state is a state where the input member 1752 is operated by the rider to be in the most oscillated state. The state where the operation amount is the first operation amount is closer to the initial state than to the state where the operation amount is the second operation amount. The state where the operation amount is the second operation amount is closer to the initial state than to the state where the operation amount is the third operation amount. The state where the operation amount is the second operation amount is farther away from the maximum operated state than from the state where the operation amount is the third operation amount. The input member may be an element other than the lever, which may be replaced by a pedal or a button. Additionally, a pressure to be inputted into the lever may be used as the operation amount. In the initial state of the input member 1752, a pressure to be inputted as an operation amount is 0 N. The maximum operated state will be defined as below. In the case of the input member 1752 being operated by the rider with his or her hand, a pressure to be inputted as an operation amount is not more than 200 N. Additionally, in the case of the input member 1752 being operated by the rider with his or her foot, a pressure to be inputted as an operation amount is not more than 350 N. These are values obtained experimentally and empirically. In the case of the input member 1752 being operated by the rider with his or her hand, when a pressure to be inputted as an operation amount is 200 N, it is regarded that the maximum operated state is attained. In the case of the input member 1752 being operated by the rider with his or her foot, when a pressure to be inputted as an operation amount is 350 N, the maximum operated state is attained. A pressure at which the first operation amount is attained is smaller than a pressure at which the second operation amount is attained. The pressure at which the second operation amount is attained is smaller than a pressure at which the third operation amount is attained. The pressure at which the third operation amount is attained is larger than the pressure at which the second operation amount is attained. The pressure at which the second operation amount is attained is larger than the pressure at which the first operation amount is attained. The input member may be an element other than the lever, and may be replaced by a pedal or a button.

The brake activator 1754 controls the input member 1752 so that at least while the vehicle is turning with the body frame 1021 leaning in the left-and-right direction of the vehicle, an activation timing at which the other of the right front brake 1072 and the left front brake 1071 which is provided on the front wheel which defines the outer wheel having the larger turning radius is activated by the input member 1752 and an activation timing at which one of the right front brake 1072 and the left front brake 1071 which is provided on the front wheel which defines the inner wheel having the smaller turning radius is activated by the input member 1752 become the same.

In the vehicle 1001, the right shock absorber 1034 includes the right telescopic element 1341 (1342) which extends and contracts in the extending and contracting direction which extends in the up-and-down direction of the body frame 1021 and allows the right front wheel 1032 to be displaced in the extending and contracting direction of the right telescopic element 1341 (1342). The left shock absorber 1033 includes the left telescopic element 1331 (1332) which extends and contracts in the extending and contracting direction which extends in the up-and-down direction of the body frame 1021 and allows the left front wheel 1031 to be displaced in the extending and contracting direction of the left telescopic element 1331 (1332).

The link mechanism 1005 is provided above the right front wheel 1032 and the left front wheel 1031 in the up-and-down direction of the body frame 1021 as viewed from the front of the vehicle with the body frame 1021 being in the upright state. The right front wheel 1032 and the left front wheel 1031 overlap the central rear wheel 1004 when the vehicle is viewed from the front thereof with the body frame 1021 leaning in the left-and-right direction of the vehicle and the right shock absorber 1034 and the left shock absorber 1033 turning most relative to the link mechanism 1005 as shown in FIG. 6. Also, when the vehicle is viewed from the front thereof with the up-and-down direction of the body frame 1021 coinciding with the vertical direction and the right shock absorber 1034 and the left shock absorber 1033 turning most relative to the link mechanism 1005, the right front wheel 1032 and the left front wheel 1031 overlap the central rear wheel 1004.

The vehicle 1001 includes a second brake system. The second brake system includes a second input member 1751 which differs from the input member 1752. The second brake system includes a second brake activator which activates the right front brake 1072 and the left front brake 1071. The second brake activator includes a front master cylinder 1753r which is activated by the second input member 1751. The front master cylinder 1753r is connected to the hydraulic pressure controller 1755 which defines a portion of the brake activator 1754 by way of the front brake hose 1704. The second brake activator includes the hydraulic pressure controller 1755 which defines a portion of the brake activator 1754. At least while the vehicle is turning with the body frame 1021 leaning in the left-and-right direction of the vehicle, the second brake activator controls the second input member 1751 so as to activate one of the right front brake 1072 and the left front brake 1071 which is provided on the front wheel which defines the outer wheel having the larger turning radius and the other of the right front brake 1072 and the left front brake 1071 which is provided on the front wheel which defines the inner wheel having the smaller turning radius to operate simultaneously. More specifically, when the second input member 1751 is operated, the front master cylinder 1753*r* is activated to generate a hydraulic pressure. The hydraulic pressure generated in the front master cylinder 1753*r* is transmitted to the hydraulic pressure controller 1755 which defines a portion of the brake activator 1754 by way of the front brake hose 1704. The hydraulic pressure controller 1755 transmits the hydraulic pressure corresponding to the hydraulic pressure transmitted thereto to the right caliper 1722 by way of the right brake hose 1724. This activates the right front brake 1072. The hydraulic pressure controller 1755 transmits the hydraulic pressure corresponding to the hydraulic pressure transmitted thereto to the left caliper 1712 by way of the left brake hose 1714. This activates the left front brake 1071. The second brake activator activates the right front brake 1072 and the left front brake 1071 by using at least a portion of the brake activator 1754. The brake activator 1754 activates the right front brake 1072 and the left front brake 1071 by using at least a portion of the second brake activator.

Figure 9:
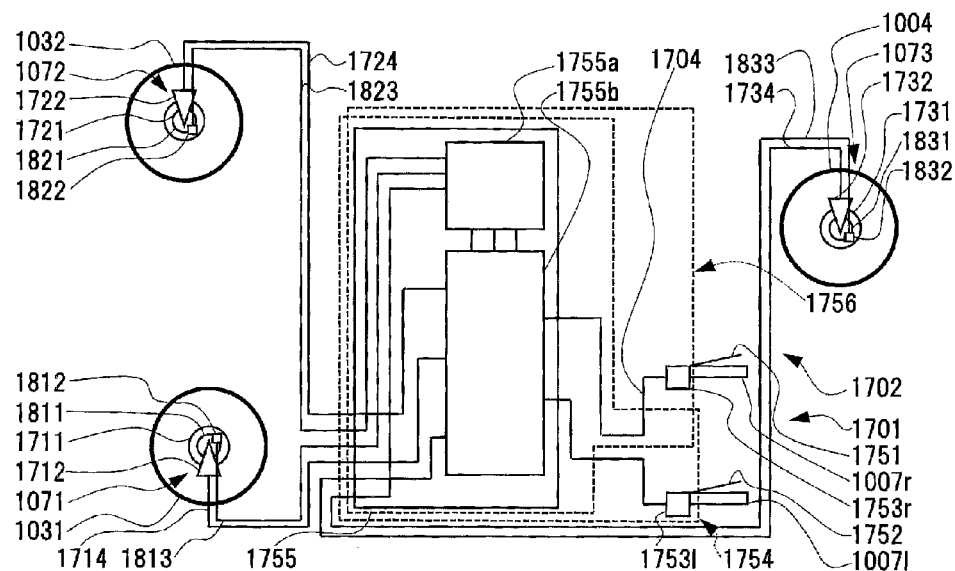
FIG. 9 is a diagram showing an example of the preferred embodiment (a first preferred embodiment of the present invention) of the brake system shown in FIGS. 8A to 8G.

FIG. 9 shows an example of a preferred embodiment of the brake system 1701 shown in FIG. 8. FIG. 9 shows the brake system 1701 shown in FIG. 8 in detail. The hydraulic pressure controller 1755 includes an electronic controller 1755*a* and a hydraulic pressure unit which is operated by the electronic controller 1755*a*. The right detector 1822 is connected to the electronic controller 1755*a* via the right sensor cord 1823. The left detector 1812 is connected to the electronic controller 1755*a* via the left sensor cord 1813. The central rear detector 1832 is a sensor that detects a rotation of a rear sensor disc 1831. The function of the central rear detector 1832 is the same as the functions of the right detector 1822 and the left detector 1812. The central rear detector 1832 is connected to the electronic controller 1755*a* via a rear sensor cord 1833. The electronic controller 1755*a* receives electric signals from the central rear detector 1832, the right detector 1822 and the left detector 1812. Then, the electronic controller 1755*a* detects a rotating speed of each wheel from an electric signal therefrom. The electronic controller 1755*a* also receives electric signals in relation to vehicle speed, vehicle posture condition and the like from other sensors (not shown) than the sensors described above. The brake activator 1754 includes a rear master cylinder 17531. When the input member 1752 is controlled by the rider, the rear master cylinder 17531 is activated to generate a hydraulic pressure. The hydraulic pressure generated is transmitted to a hydraulic pressure controller 1755 via the brake hose. The electronic controller 1755*a* of the hydraulic pressure controller 1755 controls the hydraulic pressure unit 1755*b* so as to generate hydraulic pressures corresponding to the hydraulic pressures transmitted thereto and rotating speeds of the wheels. The hydraulic pressure generated in the hydraulic pressure unit 1755*b* is transmitted to a central rear caliper 1732 byway of a rear brake hose 1734. This activates the central rear brake 1073. The hydraulic pressure generated in the hydraulic pressure unit 1755*b* is transmitted to the right caliper 1722 by way of the right brake hose 1724. This activates the right front brake 1072. The hydraulic pressure generated in the hydraulic pressure unit 1755*b* is transmitted to the left caliper 1712 by way of the left brake hose 1714. This activates the left front brake 1071. The first preferred embodiment shown in FIG. 9 includes an actuator for the right front brake 1072, an actuator for the left front brake 1071, and an actuator for the central rear brake 1073. These actuators preferably control independently the hydraulic pressures in the right front brake 1072, the left front brake 1071 and the center rear brake 1073.

Figure 10:
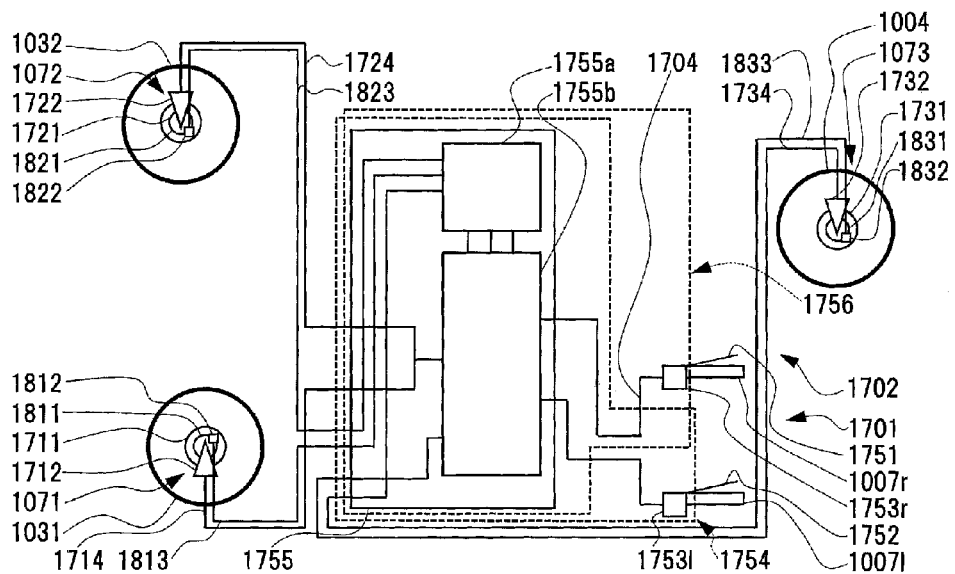
FIG. 10 is a diagram showing a modified example (a second preferred embodiment of the present invention) of brake system shown in FIGS. 8A to 8G.

FIG. 10 shows an example of a preferred embodiment of the brake system 1701 shown in FIG. 8. FIG. 10 shows the brake system 1701 shown in FIG. 8 in detail. FIG. 10 shows a modified example of the brake system 1701 shown in FIG. 9. The second preferred embodiment shown in FIG. 10 is basically the same as the preferred embodiment shown in FIG. 9. The second preferred embodiment shown in FIG. 10 includes an actuator for the right front brake 1072 and the left front brake 1071 and an actuator for the central rear brake 1073. A hydraulic pressure generated by the actuator for the right front brake 1072 and the left front brake 1071 is divided so as to be transmitted to the right front brake 1072 and the left front brake 1071 by way of the right brake hose 1724 and the left brake hose 1714, respectively. The hydraulic pressures to the left front brake 1071 and the central rear brake 1073 may be controlled independently of each other. However, the hydraulic pressures in the right front brake 1072 and the left front brake 1071 become the same.

Figure 11:
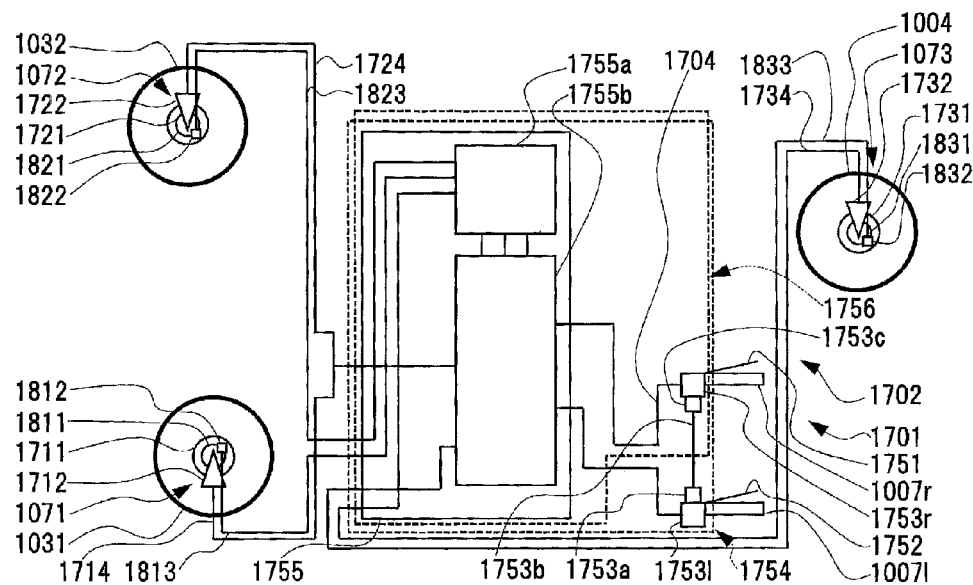
FIG. 11 is a diagram showing a modified example (a third preferred embodiment of the present invention) of the brake system shown in FIGS. 8A to 8G.

FIG. 11 shows an example of a preferred embodiment of the brake system 1701 shown in FIG. 8. FIG. 11 shows the brake system 1701 shown in FIG. 8 in detail. FIG. 11 shows a modified example of the brake systems 1701 shown in FIGS. 9, 10. The third preferred embodiment shown in FIG. 11 is basically the same as the preferred embodiment shown in FIG. 10. The third preferred embodiment shown in FIG. 11 includes an actuator for the right front brake 1072 and the left front brake 1071 and an actuator for the central rear brake 1073. A hydraulic pressure generated by the actuator for the right front brake 1072 and the left front brake 1071 is divided at a portion where the brake hose is divided so as to be transmitted to the right front brake 1072 and the left front brake 1071 by way of the right brake hose 1724 and the left brake hose 1714, respectively. The hydraulic pressures of the left front brake 1071 and the central rear brake 1073 may be controlled independently of each other. In this preferred embodiment, however, the hydraulic pressures in the right front brake 1072 and the left front brake 1071 are set to be the same. Further, in the third preferred embodiment, the brake activator 1754 includes a mechanical mechanism that changes the timing at which the hydraulic pressure is transmitted to activate the brake. In the third preferred embodiment, the brake activator 1754 includes the rear master cylinder 17531, an operating force generation mechanism 1753*a*, an operating force transmission mechanism 1753*b*, a timing changing mechanism 1753*c* and the front master cylinder 1753*r*. When the input member 1752 is operated by the rider, the operating force generation mechanism 1753*a* operates in association with the operation of the input member 1752. The operation of the operating force generation mechanism 1753*a* is transmitted to the timing changing mechanism 1753*c* via the operating force transmission mechanism 1753*b*. The timing changing mechanism 1753*c* activates the front master cylinder 1753*r* with a time delay in response to the operation received from the operating force transmission mechanism 1753*b*. Thereafter, the front master cylinder 1753*r* will operate in the same way as that in the preferred embodiment described above. The time delay is generated not by the hydraulic pressure controller 1755 but by the operating force generation mechanism 1753*a*, the operating force transmission mechanism 1753*b*, and the timing changing mechanism 1753*c*.

Figure 12:
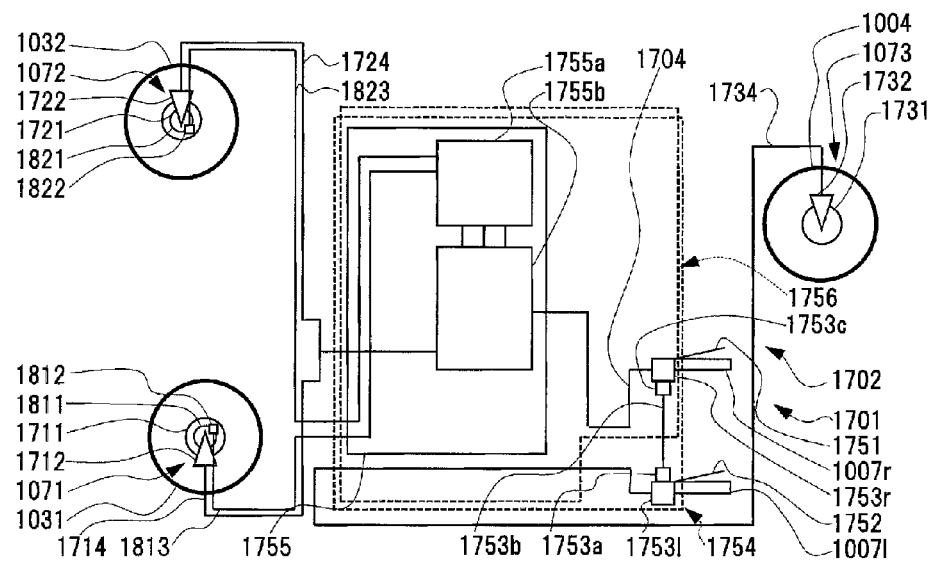
FIG. 12 is a diagram showing a modified example (a fourth preferred embodiment of the present invention) of the brake system shown in FIGS. 8A to 8G.

FIG. 12 shows an example of a preferred embodiment of the brake system 1701 shown in FIG. 8. FIG. 12 shows the brake system 1701 shown in FIG. 8 in detail. FIG. 12 shows a modified example of the brake systems 1701 shown in FIGS. 9, 10, 11. The fourth preferred embodiment shown in FIG. 12 is basically the same as the preferred embodiment shown in FIG. 11. The fourth preferred embodiment shown in FIG. 12 includes an actuator for the right front brake 1072 and the left front brake 1071. A hydraulic pressure generated by the actuator for the right front brake 1072 and the left front brake 1071 is divided at a portion where the brake hose is divided so as to be transmitted to the right front brake 1072 and the left front brake 1071 by way of the right brake hose 1724 and the left brake hose 1714, respectively. The hydraulic pressures of the right front brake 1072 and the left front brake 1071 may be controlled independently of each other. In this preferred embodiment, however, the hydraulic pressures in the right front brake 1072 and the left front brake 1071 are set to be the same. Further, in the fourth preferred embodiment, the brake activator 1754 includes a mechanical mechanism that changes the timing at which the hydraulic pressure is transmitted to activate the brake. In the fourth preferred embodiment, the brake activator 1754 includes the rear master cylinder 17531, an operating force generation mechanism 1753*a*, an operating force transmission mechanism 1753*b*, a timing changing mechanism 1753*c* and the front master cylinder 1753*r*. When the input member 1752 is operated by the rider, the operating force generation mechanism 1753*a* operates in association with the operation of the input member 1752. The operation of the operating force generation mechanism 1753*a* is transmitted to the timing changing mechanism 1753*c* via the operating force transmission mechanism 1753*b*. The timing changing mechanism 1753*c* activates the front master cylinder 1753*r* with a time delay in response to the operation received from the operating force transmission mechanism 1753*b*. Thereafter, the front master cylinder 1753*r* will operate in the same way as that in the preferred embodiment described above. The time delay is generated not by the hydraulic pressure controller 1755 but by the operating force generation mechanism 1753*a*, the operating force transmission mechanism 1753*b*, and the timing changing mechanism 1753*c*.

Figure 13:
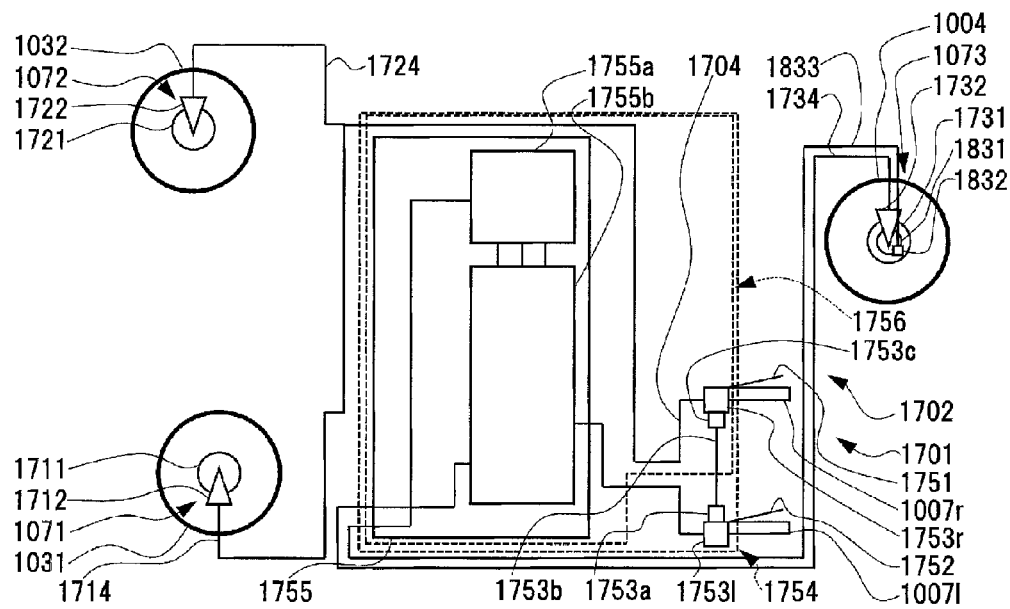
FIG. 13 is a diagram showing a modified example (a fifth preferred embodiment of the present invention) of the brake system shown in FIGS. 8A to 8G.

FIG. 13 shows an example of a preferred embodiment of the brake system 1701 shown in FIG. 8. FIG. 13 shows the brake system 1701 shown in FIG. 8 in detail. FIG. 13 shows a modified example of the brake systems 1701 shown in FIGS. 9, 10, 11, and 12. The fifth preferred embodiment shown in FIG. 13 is basically the same as the preferred embodiment shown in FIG. 11. The fifth preferred embodiment shown in FIG. 13 includes an actuator for the central rear brake 1073. The hydraulic pressure generated by the actuator for the central rear brake 1073 is transmitted to the central rear brake 1073 by way of the rear brake hose 1734. The hydraulic pressure at the central rear brake 1073 is controlled. Further, in the third preferred embodiment, the brake activator 1754 includes a mechanical mechanism that changes the timing at which the hydraulic pressure is transmitted to activate the brake. In the third preferred embodiment, the brake activator 1754 includes the rear master cylinder 17531, an operating force generation mechanism 1753*a*, an operating force transmission mechanism 1753*b*, a timing changing mechanism 1753*c* and the front master cylinder 1753*r*. When the input member 1752 is operated by the rider, the operating force generation mechanism 1753*a* operates in association with the operation of the input member 1752. The operation of the operating force generation mechanism 1753*a* is transmitted to the timing changing mechanism 1753*c* via the operating force transmission mechanism 1753*b*. The timing changing mechanism 1753*c* activates the front master cylinder 1753*r* with a time delay in response to the operation received from the operating force transmission mechanism 1753*b*. Thereafter, the front master cylinder 1753*r* will operate in the same way as that in the preferred embodiment described above. The time delay is generated not by the hydraulic pressure controller 1755 but by the operating force generation mechanism 1753*a*, the operating force transmission mechanism 1753*b*, and the timing changing mechanism 1753*c*.

The brake activator 1754 shown in the fifth preferred embodiment includes the hydraulic pressure controller 1755 which is a controller. The hydraulic pressure controller 1755 is provided between the input member 1752 and the central rear brake 1073. When a slipping condition is detected at the central rear wheel 1004 based on a signal which is detected by the central rear detector 1832, the hydraulic pressure controller 1755 controls the operating condition of the central rear brake 1073 on the central rear wheel 1004 based on the signal detected by the central rear detector 1832. In this preferred embodiment, the controller which controls hydraulic pressures is referred to as the hydraulic pressure controller. However, the hydraulic pressure controller 1755 may include elements which are connected by cables and which use no hydraulic pressures. The operator is provided between the input member 1752 and the right front brake 1072 and the left front brake 1071. The operator changes the operating conditions of the right front brake 1072 and the left front brake 1071 according to the operation quantity of the input member 1752 by associating the operation quantity of the input member 1752 with the operating conditions of the right front brake 1072 and the left front brake 1071. More specifically, the operator includes the operating force generating mechanism 1753*a*, the operating force transmitting mechanism 1753*b*, the timing changing mechanism 1753*c*, the front master cylinder 1753*r*, the front brake hose 1704, the right brake hose 1724 and the left brake hose 1714. Being configured in the way described above, the operator changes the operating conditions of the right front brake 1072 and the left front brake 1071 only according to the operation quantity of the input member 1752. In other words, in case there is no change in the operation quantity of the input member 1752, the operator does not change the operating conditions of the right front brake 1072 and the left front brake 1071. The operator does not include the controller which controls electrically the operating conditions of the right front brake 1072 and the left front brake 1071 between the input member 1752 and the right front brake 1072 and the left front brake 1071.

Figure 14:
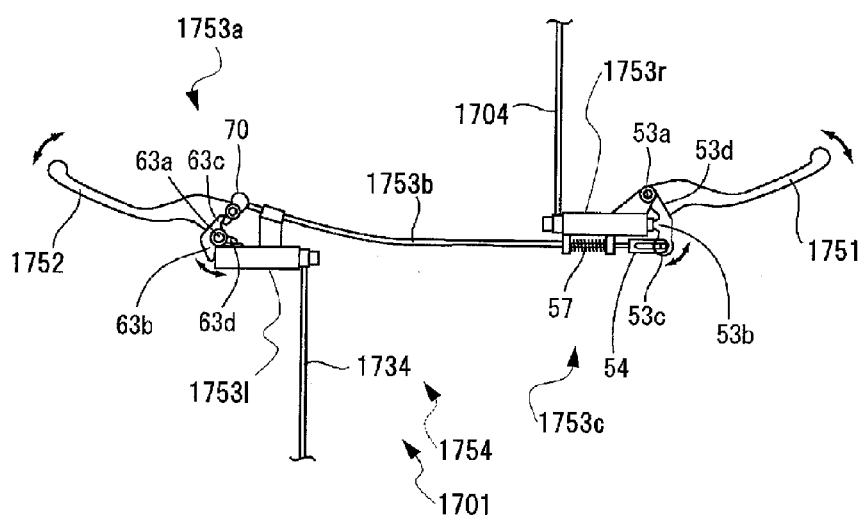
FIG. 14 is a diagram showing an example of a modified example (a sixth preferred embodiment of the present invention) of the brake activator shown in FIGS. 8A to 8G.

FIG. 14 shows an example of a preferred embodiment of the brake systems 1701 shown in FIGS. 11, 12, and 13. FIG. 14 shows the brake systems 1701 shown in FIGS. 11, 12, 13 in detail. FIG. 14 shows a modified example of the brake systems 1701 shown in FIGS. 11, 12, and 13. The sixth preferred embodiment shown in FIG. 14 shows an example of the operating force generation mechanism 1753*a*, the operating force transmission mechanism 1753*b* and the timing changing mechanism 1753*c*. The input member 1752 is preferably a lever which is able to swing about a turning shaft 63*a*. When the input member 1752 is operated, a first operating portion 63*b* provided on the input member 1752 pushes the rear master cylinder 17531. This activates the rear master cylinder 17531 to generate a hydraulic pressure. The hydraulic pressure generated is then transmitted to a rear brake hose 1734. When the input member 1752 is operated, a second operating portion 63c which is provided on the input member 1752 activates a third operating portion 70, which activates the operating force transmission mechanism 1753b which includes a wire. The operating force transmission mechanism 1753b operates, which is transmitted to a spring 57. As this occurs, a larger force than an elastic restoring force of the spring is transmitted to the spring 57 so that the spring 57 is deformed, activating a connecting member 54. When the connecting member 54 is activated, a fourth operating portion 53c and a fifth operating portion 53b are activated to push the front master cylinder 1753r. This activates the front master cylinder 1753r to generate a hydraulic pressure. The hydraulic pressure generated is then transmitted to a front brake hose 1704. This configuration prevents the front master cylinder 1753r from operating immediately even though the input member 1752 is operated. Thereafter, by operating the input member 1752 further, the front master cylinder 1753r operates with a certain time delay. By changing its size or the like, the mechanical mechanism is able to change not only the timing at which the hydraulic pressure is generated but also the magnitude of a hydraulic pressure to be generated.

The second input member 1751 is preferably a lever member which is able to swing about a turning shaft 53a. When the second input member is operated, a sixth operating portion 53d and the fifth operating portion 53b operate, which pushes on the front master cylinder 1753r. This activates the front master cylinder 1753r to generate a hydraulic pressure. The hydraulic pressure generated is then transmitted to a front brake hose 1704. The operating force generation mechanism 1753a includes the first operating portion 63b, the second operating portion 63c and the third operating portion 70. The operating force transmission mechanism 1753b includes the wire. The timing changing mechanism 1753c includes the spring 57, the connecting member 54, the fourth operating portion 53c, the fifth operating portion 53b and the sixth operating portion 53d. The hydraulic pressure controller 1755 includes the operating force generation mechanism 1753a, the operating force transmission mechanism 1753b, the timing changing mechanism 1753c, the rear master cylinder 17531, the front master cylinder 1753r, the front brake hose 1704, and the rear brake hose 1734. The second brake activator includes the sixth operating portion 53d, the fifth operating portion 53b, the front master cylinder 1753r and the front brake hose 1704.

As shown in FIG. 1, the hydraulic pressure controller 1755 is disposed directly ahead of the link mechanism 1005 in the front-and-rear direction of the vehicle 1001. The hydraulic pressure controller 1755 is supported on the body frame 1021 via a bracket. As shown in FIG. 1, the hydraulic pressure controller 1755 may be disposed in the body frame 1021 below a foot rest on which the rider rests his or her feet. In addition, the hydraulic pressure controller 1755 may also be disposed below the seat 1024 on which the rider sits. The hydraulic pressure controller 1755 may be disposed in the body frame 1021 inwards of the body cover 1022. The handlebar 1023 of the steering mechanism 1007 is preferably a bar which extends in the left-and-right direction of the body frame 1021. The handlebar 1023 includes a right grip 1007r which the rider grips at a right end portion thereof. The handlebar 1023 includes a left grip 10071 which the rider grips at a left end portion thereof. The rider is able to control the input member 1752 and the second input member 1751 while gripping the right grip 1007r and the left grip 10071.

Figure 15:
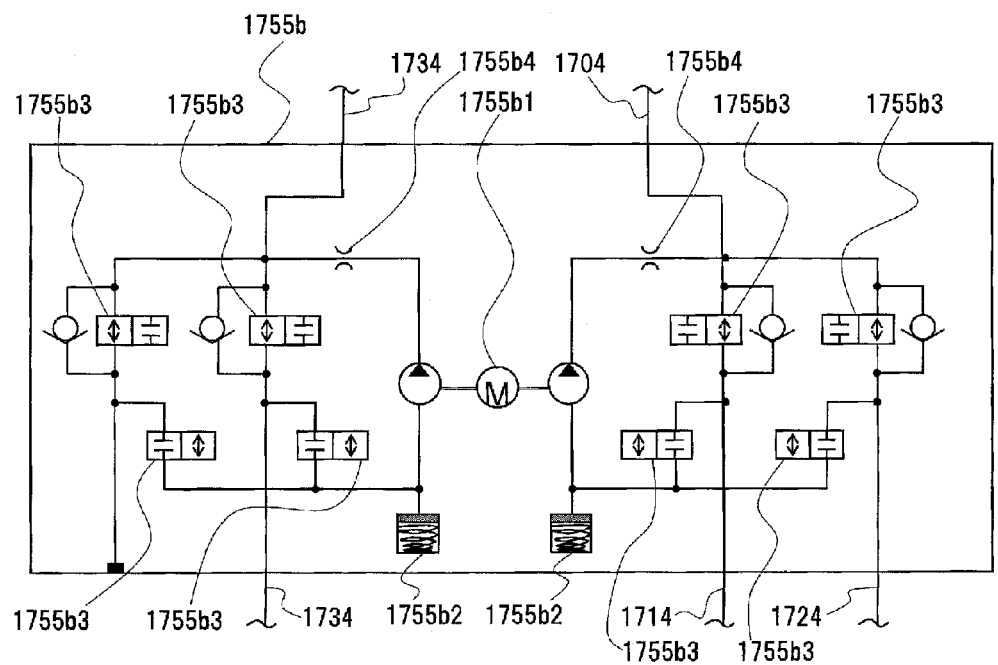
FIG. 15 is a diagram showing an example of a preferred embodiment (a first preferred embodiment of the present invention) of a hydraulic pressure unit shown in FIGS. 8A to 8G.

FIG. 15 shows an example of a preferred embodiment of the brake system 1701 shown in FIG. 9. FIG. 15 shows the brake system 1701 shown in FIG. 9 in detail. FIG. 15 shows an example of the hydraulic pressure unit 1755b. This hydraulic pressure unit 1755b includes a motor 1755b1 which generates a hydraulic pressure. The hydraulic pressure unit 1755b includes a buffer chamber 1755b2 which stores fluid. The hydraulic pressure unit 1755b includes a solenoid valve 1755b3. The hydraulic pressure unit 1755b includes a throttle 1755b4. The motor 1755b1 is controlled by an electronic controller 1755a. The solenoid valve 1755b3 is controlled by the electronic controller 1755a. The electronic controller 1755a controls the motor 1755b1 and the solenoid valve 1755b3 to activate the left front brake 1071, the right front brake 1072 and the central rear brake 1073.

In this preferred embodiment, control or operation has been described which occurs when the vehicle is turning with the body frame 1021 leaning in the left-and-right direction of the vehicle. The present invention does not exclude a situation where the brake activator 1754 operates in the manner described above in other conditions than the condition where the vehicle is turning with the body frame 1021 leaning in the left-and-right direction of the vehicle, for example, in a condition where the vehicle is running with the body frame 1021 being in the upright state. The present invention includes all cases in which the brake activator 1754 operates in the manner described above at least when the vehicle is turning with the body frame 1021 leaning in the left-and-right direction of the vehicle.

In the preferred embodiments described above, the brake system 1701 preferably includes the right front brake 1072, the left front brake 1071, the central rear brake 1073, the single input 1752 and the brake activator 1754 which activates the three brakes due to the operation of the input unit 1752. This enables the brake system 1701 to be used for the vehicle 1001 including the body frame 1021 which leans, the right front wheel 1032, the left front wheel 1031 and the central rear wheel 1004.

The vehicle 1001 including the body frame which leans, the two front wheels, and the single rear wheel has the following characteristics when the vehicle is turning with the body frame 1021 leaning in the left-and-right direction of the vehicle.

When the vehicle is turning with the body frame 1021 leaning to the right, the right front wheel 1032 defines the inner wheel having the smaller turning radius and the left front wheel 1031 defines the outer wheel having the larger turning radius. When the vehicle is turning with the body frame 1021 leaning to the left, the left front wheel 1031 defines the inner wheel having the smaller turning radius and the right front wheel 1032 defines the outer wheel having the larger turning radius. Since the vehicle turns with the body frame 1021 leaning in the left-and-right direction of the vehicle, a load exerted on the front wheel which defines the inner wheel basically tends to be greater than a load exerted on the front wheel which defines the outer wheel of the vehicle which is turning. Moreover, compared with a vehicle including a left rear wheel and a right rear wheel, the vehicle including the single central rear wheel 1004 has a tendency that the load exerted on the front wheels becomes relatively greater than the load exerted on the rear wheel. Because of this, the load exerted on the front wheel which defines the inner wheel tends basically to be greater than the load exerted on the front wheel which defines the outer wheel of the vehicle which is turning.

The inventor of the present invention has studied brake systems while taking into consideration the characteristics of the vehicle having the body frame which leans, the two front wheels, and the single rear wheel. Additionally, the inventor has studied the braking forces in the central rear wheel, the right front wheel and the left front wheel at least while the vehicle is turning with the body frame leaning in the left-and-right direction of the vehicle and while the central rear brake, the right front brake and the left front brake are in operation. It has been discovered from the results of the studies that the central rear wheel is easy to start slipping earlier than the right front wheel and the left front wheel. Additionally, it has been discovered that even in such a state, the braking forces in the front wheels are increased on many occasions. Moreover, the front wheel which defines the inner wheel, the front wheel which defines the outer wheel and the central rear wheel of the vehicle which is turning pass over road surfaces which are different from one another. This results in a high possibility that the front wheel which defines the inner wheel, the front wheel which defines the outer wheel and the central rear wheel of the vehicle which is turning pass over road surfaces having friction coefficients which differ from one another. Then, the inventor of the present invention has conceived a brake system which takes this situation into consideration.

According to a preferred embodiment of present invention, the brake activator 1754 operates in the following manner at least while the vehicle is turning with the body frame 1021 leaning in the left-and-right direction of the vehicle and while the central rear brake 1073, the right front brake 1072 and the left front brake 1071 are in operation as a result of operation of the input member 1752 and in such a state that both the right front wheel 1032 and the left front wheel 1031 are not slipping. When a slipping condition is detected at the central rear wheel 1004 based on a signal detected by the central rear detector 1832, the brake activator 1754 controls the operating condition of the central rear brake 1073 based on the signal detected by the central rear detector 1832 so as to reduce the braking force on the central rear wheel 1004 to lower than the braking force which is obtained as a result of operation of the input member 1752. In this state, when the operation quantity of the input member 1752 increases as a result of operation of the input member 1752, changing the operating conditions of both the right front brake 1072 and the left front brake 1071, the brake activator 1754 increases the braking forces in both the right front wheel 1032 and the left front wheel 1031 according to the operation quantity of the input member 1752. By controlling the input member 1752 in the way described above, the central rear brake 1073, the right front brake 1072 and the left front brake 1071 are activated. By controlling the input member 1752 in that way, the rider is able to increase the braking forces in the right front wheel and the left front wheel although the braking force on the central rear wheel 1004 is reduced. By controlling the input member 1752 in that way, the rider is able to increase the braking forces on the right front wheel and the left front wheel while maintaining the braking force on the central rear wheel 1004. By controlling the input member 1752 in that way, the rider is able to increase the braking forces on the right front wheel and the left front wheel while restricting the central rear wheel 1004 from being put in a slipping condition. Because of this, the brake system is able to be used for the vehicle including the body frame which leans, the two front wheels, and the single rear wheel and differs in operation from the conventional three brake systems.

The up-and-down direction of the vehicle coincides with the direction which is vertical to the surface of the ground. The left-and-right direction of the vehicle coincides with the direction which is parallel to the surface of the ground. The vehicle described in the preferred embodiments above is preferably a vehicle which leans. With the vehicle leaning, the up-and-down direction of the vehicle coincides with the direction which is vertical to the surface of the ground. However, with the vehicle leaning, the body frame leans relative to the surface of the ground. In other words, the up-and-down direction of the body frame coincides with the up-and-down direction of the vehicle with the vehicle being in the upright state. However, with the vehicle leaning, the up-and-down direction of the body frame leans relative to the up-and-down direction of the vehicle. Additionally, the left-to-rear direction of the body frame coincides with the left-and-right direction of the vehicle with the vehicle being in the upright state. With the vehicle leaning, however, the left-and-right direction of the body frame leans with respect to the left-and-right direction of the vehicle. In the preferred embodiments above, description is based on the up-and-down direction, the left-and-right direction and front-and-rear direction of the vehicle.

Vehicles according to preferred embodiments of the present invention are preferably vehicles which include the body frame which leans and the two front wheels. The vehicles may include the body cover which covers the body frame. The vehicles may not include the body cover which covers the body frame. The power source of the vehicles is not limited to the engine and hence, an electric motor may be used as the power source.

In the preferred embodiments above, the lateral center of the central rear wheel preferably coincides with the lateral center between the right front wheel and the left front wheel. However, the lateral center of the central rear wheel may not coincide with the lateral center between the right front wheel and the left front wheel. In a preferred embodiment of the present invention, when the vehicle is viewed from above with the body frame being in the upright state, it is preferable that the central rear wheel is present on a center line between the right front wheel and the left front wheel in relation to the left-and-right direction.

In the preferred embodiments above, the input member is preferably a lever which the rider operates with his or her hand. However, the input member may be a pedal which the rider depresses with his or her foot. Additionally, the input member may be a push button or a rotary grip which is operated by the rider. The input member is operated between the initial state where the rider does not touch the input member with his or her hand or foot to the maximum operated state where the rider operates it most with his or her hand or foot. The input member is operated between the initial state and the maximum operated state by the rider. The operation amount of the input member may include the position where the input member is in the initial state. As this occurs, the operation amount is detected by providing the sensor which detects the position of the input member. The operation amount of the input member may be a variation in the pressure from the initial state of the input member. As this occurs, the operation amount is detected by providing a sensor which detects a hydraulic pressure generated by the master cylinder. In addition, the operation amount may be detected by providing a sensor which detects a pressure which is applied directly to the input member. The operation amount of the input member is a physical amount which changes according to the operation of the input member by the rider. The operation amount does not necessarily have to be detected by the sensor, and hence, a mechanism may be used operates in mechanical association with the operation amount.

In the preferred embodiments above, a disc brake which uses hydraulic pressure is preferably used for the brakes. However, the type of brake is not limited thereto, and hence, various types of brakes may be used which include a drum brake, an electromagnetic brake, a wet multi-plate brake and the like.

In the preferred embodiments above, a type of brake activator which controls hydraulic pressure electronically is preferably used for the brake activator. However, the brake activator is not limited to the type in which hydraulic pressures are controlled electronically, and hence, hydraulic pressures may be controlled with a mechanical mechanism. In addition, brake wires may be used for connection in place of the brake hoses, so that the control is executed with the mechanical mechanism without using hydraulic pressures. As this occurs, the usage of an electric controller is not required.

In a preferred embodiment of the present invention, it is possible to use the type of brake activator which operates based on electronic control or mechanical mechanism and the brake system using the brake activator. As this occurs, in the brake activator which operates based on electronic control, although it is designed that the controls are carried out at the same time, in reality, there may be a situation where a slight time delay or lag occurs. In addition, in the brake activator which operates based on the mechanical mechanism, although it is designed that the controls are executed at the same time, there may be a situation where a slight time lag is generated due to an error of a mechanical element or a difference in length of the transmission lines of the operating force. In a preferred embodiment, the slight time lag is ignored so that the controls are carried out at the same time. When referred to herein, "at the same time" has a broader meaning that that defined in dictionaries. Similarly, in the event that controls are carried out with a time lag which provide the same working effect as that obtained when the controls are carried out at the same time, it is understood that the controls are carried out at the same time.

In a preferred embodiment of the present invention, the link mechanism may include further a cross member in addition to the upper cross member and the lower cross member. The upper cross member and the lower cross member are so called only from their relative positional relationship in the up-and-down direction. The upper cross member does not necessarily imply an uppermost cross member in the link mechanism. The upper cross member means a cross member which lies above a cross member which lies therebelow. The lower cross member does not necessarily imply a lowermost cross member in the link mechanism. The lower cross member means a cross member which lies below a cross member which lies above. Additionally, the cross member may include two portions of a right cross member and a left cross member. In this way, the upper cross member and the lower cross member may each include a plurality of portions as long as they still exhibit the link function. Further, another cross member may be provided between the upper cross member and the lower cross member. The link mechanism preferably includes the upper cross member and the lower cross member.

When referred to in this description, "parallel" includes two straight lines which do not intersect each other as members while they incline within the range of ±40 degrees. When referred to in relation to the "direction," and the "member", the term "along" also includes a case where the direction and the member are inclined within the range of ±40 degrees. When used together with a "direction", "extend" also includes a case where what extends is inclined within the range of ±40° relative to the direction.

The terms and expressions which are used herein are used to describe the preferred embodiments of the present invention and hence should not be construed as limiting the scope of the present invention. It should be understood that any equivalents to the characteristic matters which are shown and described herein should not be excluded and that various modifications within the scope of claims are permitted.

The present invention can be embodied in many different forms. This disclosure should be understood to provide preferred embodiments of the present invention. Based on the understanding that the preferred embodiments which are described and/or illustrated herein are not intended to limit the present invention thereto, several preferred embodiments are described and illustrated herein.

Several illustrated preferred embodiments of the present invention are described herein. The present invention is not limited to the various preferred embodiments described herein. The present invention also includes every preferred embodiment which includes equivalent elements, modifications, deletions, combinations (for example, a combination of characteristics of various preferred embodiments), improvements and/or alternations which those skilled in the art to which the present invention pertains can recognize based on the disclosure herein. The limitative matters of claims should be construed broadly based on terms used in the claims and hence should not be limited by the preferred embodiments described in this description or the prosecution of the present invention. Those preferred embodiments should be construed as non-exclusive. For example, in this disclosure, the terms "preferably" and "may" should be construed as being non-exclusive and those terms mean, respectively, "preferable but not limited thereto" and "will be acceptable but not limited thereto."

This application claims priority to Japanese Patent Application No. 2013-227456 filed on Oct. 31, 2013, the entire contents of which are incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A brake system for a vehicle, the brake system comprising:
a central rear brake on a central rear wheel of the vehicle to generate a braking force on the central rear wheel;
a right front brake on a right front wheel of the vehicle to generate a braking force on the right front wheel;
a left front brake on a left front wheel of the vehicle to generate a braking force on the left front wheel;
a central rear wheel slip detector that detects a slipping condition at the central rear wheel;
an input operated by a rider; and
a brake activator; wherein
the brake activator, when the slipping condition is detected at the central rear wheel based on a signal detected by the central rear wheel slip detector, controls an operating condition of the central rear brake based on the signal detected by the central rear wheel slip detector so as to reduce the braking force on the central rear wheel lower than a braking force which is obtained as a result of an operation of the input while the central rear brake, the right front brake, and the left front brake are in operation as a result of the operation of the input and in a non-slipping state in which the right front wheel and the left front wheel are not slipping, at least while the vehicle is turning with a body frame of the vehicle leaning in a left-and-right direction of the vehicle; and the brake activator, when the slipping condition is detected at the central rear wheel based on the signal detected by the central rear wheel slip detector and an operation quantity of the input increases as a result of the operation of the input, changes operating conditions of both the right front brake and the left front brake to increase braking forces on both the right front wheel and the left front wheel according to the operation quantity of the input member, at least while the vehicle is turning with the body frame of the vehicle leaning in the left-and-right direction of the vehicle.

2. The braking system according to claim 1, further comprising:
a right front wheel slip detector that detects a slipping condition at the right front wheel; and
a left front wheel slip detector that detects a slipping condition at the left front wheel; wherein
when the slipping condition is detected at the central rear wheel based on the signal detected by the central rear wheel slip detector, the brake activator controls the operating condition of the central rear brake based on the signal detected by the central rear wheel slip detector so as to reduce the braking force on the central rear wheel lower than the braking force which is obtained as a result of operation of the input at least while the vehicle is turning with the body frame leaning in the left-and-right direction of the vehicle and while the central rear brake, the right front brake, and the left front brake are in operation as a result of the operation of the input and in a non-detection state in which the slipping condition is not detected at the right front wheel and the left front wheel based on signals detected by the right front wheel slip detector and the left front wheel slip detector; and
in the non-detection state, when the operation quantity of the input increases as a result of the operation of the input changing the operating conditions of both the right front brake and the left front brake, the brake activator increases braking forces in both the right front wheel and the left front wheel according to the operation quantity of the input.

3. The brake system according to claim 2, wherein
in the non-detection state, when the slipping condition is detected at the right front wheel or at the left front wheel based on the signals which are detected by the right front wheel slip detector and the left front wheel slip detector, the brake activator controls the operating conditions of both the right front brake and the left front brake based on the signal detected by one of the right front wheel slip detector and the left front wheel slip detector to reduce the braking forces in both the right front wheel and the left front wheel lower than braking forces which are obtained as a result of the operation of the input.

4. The brake system according to claim 2, wherein
in the non-detection state, although a slipping condition is detected at the right front wheel or at the left front wheel based on the signals which are detected by the right front wheel slip detector and the left front wheel slip detector, the brake activator does not immediately change the operating condition of the right front brake or the left front brake based on the signal detected by the right front wheel slip detector or the left front wheel slip detector.

5. The brake system according to claim 2, wherein the brake activator includes:
a controller between the input and the central rear brake and that, when the slipping condition is detected at the central rear wheel based on the signal detected by the central rear wheel slip detector, controls the operating condition of the central rear brake based on the signal detected by the central rear wheel slip detector; and
an operator between the input and the right front brake and the left front brake that changes the operating conditions of the right front brake and the left front brake according to the operation quantity of the input by associating the operation quantity of the input with the operating conditions of the right front brake and the left front brake.

6. The brake system according to claim 1, wherein at least while the vehicle is turning with the body frame leaning in the left-and-right direction of the vehicle, the brake activator activates first the central rear brake among the right front brake, the left front brake, and the central rear brake as a result of the operation of the input and activates last one of the right front brake and the left front brake on the front wheel defining an inner wheel having a smaller turning radius.

7. A vehicle comprising:
a body frame;
a right front wheel and a left front wheel aligned in a left-and-right direction of the body frame when the vehicle is viewed from a front thereof with the body frame being in an upright state;
a central rear wheel behind the right front wheel and the left front wheel in a front-and-rear direction of the body frame disposed between the right front wheel and the left front wheel when the vehicle is viewed from the front thereof with the body frame being in the upright state;
a right shock absorber that supports the right front wheel at a lower portion thereof and absorbs an upward displacement of the right front wheel in an up-and-down direction of the body frame;
a left shock absorber that supports the left front wheel at a lower portion thereof and absorbs an upward displacement of the left front wheel in the up-and-down direction of the body frame; and
a linkage above the right front wheel and the left front wheel in the up-and-down direction of the body frame when the vehicle is viewed from the front thereof with the body frame being in the upright state and that supports an upper portion of the right shock absorber and an upper portion of the left shock absorber so as to turn, and at least a portion of which is supported on the body frame so as to turn about a turning axis which extends forwards in the front-and-rear direction of the body frame and upwards in the up-and-down direction of the body frame;
a central rear brake on the central rear wheel to generate a braking force on the central rear wheel;
a right front brake on the right front wheel to generate a braking force on the right front wheel;
a left front brake on the left front wheel to generate a braking force on the left front wheel;
a central rear wheel slip detector that detects a slipping condition at the central rear wheel;

an input operated by a rider; and a brake activator; wherein the brake activator, when the slipping condition is detected at the central rear wheel based on a signal detected by the central rear wheel slip detector, controls an operating condition of the central rear brake based on the signal detected by the central rear wheel slip detector so as to reduce the braking force on the central rear wheel lower than a braking force which is obtained as a result of an operation of the input while the central rear brake, the right front brake, and the left front brake are in operation as a result of the operation of the input and in a non-slipping state in which the right front wheel and the left front wheel are not slipping, at least while the vehicle is turning with the body frame leaning in the left-and-right direction of the vehicle; and the brake activator, when the slipping condition is detected at the central rear wheel based on the signal detected by the central rear wheel slip detector and an operation quantity of the input increases as a result of the operation of the input, changes the operating conditions of both the right front brake and the left front brake to increase braking forces on both the right front wheel and the left front wheel according to the operation quantity of the input member, at least while the vehicle is turning with the body frame leaning in the left-and-right direction of the vehicle.

8. The vehicle according to claim 7, wherein the right shock absorber includes a right telescopic arm that extends and contracts in an extending and contracting direction extending in the up-and-down direction of the body frame and allows the right front wheel to be displaced in the extending and contracting direction of the right telescopic arm; and the left shock absorber includes a left telescopic arm that extends and contracts in an extending and contracting direction extending in the up-and-down direction of the body frame and allows the left front wheel to be displaced in the extending and contracting direction of the left telescopic arm.

9. The vehicle according to claim 7, wherein the linkage is above the right front wheel and the left front wheel in the up-and-down direction of the body frame when the vehicle with the body frame being in the upright state is viewed from the front thereof; and the right front wheel and the left front wheel overlap the central rear wheel when the vehicle is viewed from the front thereof with the right shock absorber and the left shock absorber turned most relative to the linkage.

10. The vehicle according to claim 7, further comprising a second brake system including:

a second input which differs from the input; and a second brake activator that activates the right front brake, the left front brake, and the central rear brake on the central rear wheel as a result of the operation of the second input at least while the vehicle is turning with the body frame leaning in the left-and-right direction of the vehicle.

11. The vehicle according to claim 10, wherein the second brake activator activates the right front brake and the left front brake by using at least a portion of the brake activator.

* * * * *